(12) United States Patent
Sim-Tang et al.

(10) Patent No.: US 8,108,429 B2
(45) Date of Patent: Jan. 31, 2012

(54) SYSTEM FOR MOVING REAL-TIME DATA EVENTS ACROSS A PLURALITY OF DEVICES IN A NETWORK FOR SIMULTANEOUS DATA PROTECTION, REPLICATION, AND ACCESS SERVICES

(75) Inventors: Siew Yong Sim-Tang, Saratoga, CA (US); Daniel J. Fraisl, Saratoga, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 496 days.

(21) Appl. No.: 11/123,994

(22) Filed: May 6, 2005

(65) Prior Publication Data

US 2005/0262097 A1    Nov. 24, 2005

Related U.S. Application Data

(60) Provisional application No. 60/569,164, filed on May 7, 2004.

(51) Int. Cl.
  *G06F 7/00* (2006.01)
  *G06F 17/30* (2006.01)
(52) U.S. Cl. ........ 707/790; 707/648; 707/791; 707/802; 717/104
(58) Field of Classification Search ............... 707/1–206
  See application file for complete search history.

(56) References Cited

U.S. PATENT DOCUMENTS

| | | | |
|---|---|---|---|
| 3,555,184 A | 1/1971 | Townley | |
| 3,555,195 A | 1/1971 | Rester et al. | |
| 3,555,204 A | 1/1971 | Braun | |
| 3,555,251 A | 1/1971 | Shavit | |
| 3,648,250 A | 3/1972 | Low et al. | |
| 4,162,536 A | 7/1979 | Morley | |

(Continued)

FOREIGN PATENT DOCUMENTS

WO    WO-98/19262 A1    5/1998

(Continued)

OTHER PUBLICATIONS

Thomas Plagemman, Towards Middleware Services for Mobile AD-HOC Network Applications, May 2003, IEEE (FTDCS'03), pp. 1-7.*

(Continued)

*Primary Examiner* — Mohammad Ali
*Assistant Examiner* — Angelica Ruiz
(74) *Attorney, Agent, or Firm* — Knobbe Martens Olson & Bear, LLP

(57) ABSTRACT

A data management system or "DMS" provides a wide range of data services to data sources associated with a set of application host servers. The data management system typically comprises one or more regions, with each region having one or more clusters. A given cluster has one or more nodes that share storage. To facilitate the data service, a host driver embedded in an application server connects an application and its data to a cluster. The host driver provides a method and apparatus for capturing real-time data transactions in the form of an event journal that is provided to the data management system. The driver functions to translate traditional file/database/block I/O into a continuous, application-aware, output data stream. Using the streams generated in this manner, the DMS offers a wide range of data services that include, by way of example only: data protection (and recovery), disaster recovery (data distribution and data replication), data copy, and data query and access.

11 Claims, 14 Drawing Sheets an example of a File object instance

U.S. PATENT DOCUMENTS

| | | |
|---|---|---|
| 4,402,045 A | 8/1983 | Krol |
| 4,415,792 A | 11/1983 | Jordan |
| 4,450,556 A | 5/1984 | Boleda et al. |
| 4,451,108 A | 5/1984 | Skidmore |
| 4,455,483 A | 6/1984 | Schonhuber |
| 4,502,082 A | 2/1985 | Ragle et al. |
| 4,512,020 A | 4/1985 | Krol et al. |
| 4,796,260 A | 1/1989 | Schilling et al. |
| 4,882,737 A | 11/1989 | Dzung |
| 4,916,450 A | 4/1990 | Davis |
| 4,972,474 A | 11/1990 | Sabin |
| 5,005,197 A | 4/1991 | Parsons et al. |
| 5,148,479 A | 9/1992 | Bird et al. |
| 5,177,796 A | 1/1993 | Feig et al. |
| 5,224,212 A | 6/1993 | Rosenthal et al. |
| 5,274,508 A | 12/1993 | Tan et al. |
| 5,280,584 A | 1/1994 | Caesar et al. |
| 5,287,504 A | 2/1994 | Carpenter et al. |
| 5,303,393 A | 4/1994 | Noreen et al. |
| 5,305,326 A | 4/1994 | Solomon et al. |
| 5,311,197 A | 5/1994 | Sorden et al. |
| 5,319,395 A | 6/1994 | Larky et al. |
| 5,321,699 A | 6/1994 | Endoh et al. |
| 5,363,371 A | 11/1994 | Roy et al. |
| 5,365,516 A | 11/1994 | Jandrell |
| 5,373,372 A | 12/1994 | Loewen |
| 5,377,102 A | 12/1994 | Nishiishigaki |
| 5,382,508 A | 1/1995 | Ikenoue |
| 5,386,422 A | 1/1995 | Endoh et al. |
| 5,387,994 A | 2/1995 | McCormack et al. |
| 5,388,074 A | 2/1995 | Buckenmaier |
| 5,392,209 A | 2/1995 | Eason et al. |
| 5,396,600 A | 3/1995 | Thompson et al. |
| 5,416,831 A | 5/1995 | Chewning, III et al. |
| 5,424,778 A | 6/1995 | Sugiyama et al. |
| 5,430,830 A | 7/1995 | Frank et al. |
| 5,440,686 A | 8/1995 | Dahman et al. |
| 5,469,444 A | 11/1995 | Endoh et al. |
| 5,477,492 A | 12/1995 | Ohsaki et al. |
| 5,479,654 A | 12/1995 | Squibb |
| 5,481,531 A | 1/1996 | Yamamuro |
| 5,499,512 A | 3/1996 | Jurewicz et al. |
| 5,502,491 A | 3/1996 | Sugiyama et al. |
| 5,506,965 A | 4/1996 | Naoe |
| 5,507,024 A | 4/1996 | Richards, Jr. |
| 5,511,212 A | 4/1996 | Rockoff |
| 5,526,357 A | 6/1996 | Jandrell |
| 5,537,945 A | 7/1996 | Sugihara et al. |
| 5,560,033 A | 9/1996 | Doherty et al. |
| 5,561,671 A | 10/1996 | Akiyama |
| 5,583,975 A | 12/1996 | Naka et al. |
| 5,602,638 A | 2/1997 | Boulware |
| 5,606,601 A | 2/1997 | Witzman et al. |
| 5,640,159 A | 6/1997 | Furlan et al. |
| 5,644,763 A | 7/1997 | Roy |
| 5,651,129 A | 7/1997 | Yokote et al. |
| 5,657,398 A | 8/1997 | Guilak |
| 5,678,042 A | 10/1997 | Pisello et al. |
| 5,684,536 A | 11/1997 | Sugiyama et al. |
| 5,684,693 A | 11/1997 | Li |
| 5,684,774 A | 11/1997 | Yamamuro |
| 5,724,241 A | 3/1998 | Wood et al. |
| 5,729,743 A | 3/1998 | Squibb |
| 5,737,399 A | 4/1998 | Witzman et al. |
| 5,742,509 A | 4/1998 | Goldberg et al. |
| 5,742,915 A | 4/1998 | Stafford |
| 5,754,772 A | 5/1998 | Leaf |
| 5,764,691 A | 6/1998 | Hennedy et al. |
| 5,768,159 A | 6/1998 | Belkadi et al. |
| 5,778,370 A | 7/1998 | Emerson |
| 5,781,612 A | 7/1998 | Choi et al. |
| 5,784,366 A | 7/1998 | Apelewicz |
| 5,794,252 A | 8/1998 | Bailey et al. |
| 5,805,155 A | 9/1998 | Allibhoy et al. |
| 5,812,130 A * | 9/1998 | Van Huben et al. .......... 715/764 |
| RE35,920 E | 10/1998 | Sorden et al. |
| 5,819,020 A | 10/1998 | Beeler, Jr. |
| 5,822,749 A | 10/1998 | Agarwal |
| 5,826,265 A | 10/1998 | Van Huben et al. |
| 5,831,903 A | 11/1998 | Ohuchi et al. |
| 5,841,717 A | 11/1998 | Yamaguchi |
| 5,841,771 A | 11/1998 | Irwin et al. |
| 5,848,072 A | 12/1998 | Prill et al. |
| 5,854,834 A | 12/1998 | Gottlieb et al. |
| 5,862,136 A | 1/1999 | Irwin |
| 5,864,875 A | 1/1999 | Van Huben et al. |
| 5,877,742 A | 3/1999 | Klink |
| 5,878,408 A | 3/1999 | Van Huben et al. |
| 5,893,119 A | 4/1999 | Squibb |
| 5,894,494 A | 4/1999 | Davidovici |
| 5,909,435 A | 6/1999 | Apelewicz |
| 5,917,429 A | 6/1999 | Otis, Jr. et al. |
| 5,918,248 A | 6/1999 | Newell et al. |
| 5,920,867 A | 7/1999 | Van Huben et al. |
| 5,920,873 A | 7/1999 | Van Huben et al. |
| 5,928,327 A | 7/1999 | Wang et al. |
| 5,930,732 A | 7/1999 | Domanik et al. |
| 5,930,762 A | 7/1999 | Masch |
| 5,931,928 A | 8/1999 | Brennan et al. |
| 5,937,168 A | 8/1999 | Anderson et al. |
| 5,940,823 A | 8/1999 | Schreiber et al. |
| 5,950,201 A | 9/1999 | Van Huben et al. |
| 5,953,729 A | 9/1999 | Cabrera et al. |
| 5,958,010 A | 9/1999 | Agarwal et al. |
| 5,966,707 A | 10/1999 | Van Huben et al. |
| 5,974,563 A | 10/1999 | Beeler, Jr. |
| 5,980,096 A | 11/1999 | Thalhammer-Reyero |
| 5,999,562 A | 12/1999 | Hennedy et al. |
| 6,005,846 A | 12/1999 | Best et al. |
| 6,005,860 A | 12/1999 | Anderson et al. |
| 6,031,848 A | 2/2000 | Brennan |
| 6,035,297 A | 3/2000 | Van Huben et al. |
| 6,047,323 A * | 4/2000 | Krause .......... 709/227 |
| 6,065,018 A | 5/2000 | Beier et al. |
| 6,072,185 A | 6/2000 | Arai et al. |
| 6,088,693 A | 7/2000 | Van Huben et al. |
| 6,094,654 A | 7/2000 | Van Huben et al. |
| 6,108,318 A | 8/2000 | Kolev et al. |
| 6,108,410 A | 8/2000 | Reding et al. |
| 6,154,847 A | 11/2000 | Schofield et al. |
| 6,158,019 A | 12/2000 | Squibb |
| 6,163,856 A | 12/2000 | Dion et al. |
| 6,178,121 B1 | 1/2001 | Maruyama |
| 6,181,609 B1 | 1/2001 | Muraoka |
| 6,189,016 B1 | 2/2001 | Cabrera et al. |
| 6,237,122 B1 | 5/2001 | Maki |
| 6,243,348 B1 | 6/2001 | Goodberlet |
| 6,249,824 B1 | 6/2001 | Henrichs |
| 6,366,926 B1 | 4/2002 | Pohlmann et al. |
| 6,366,988 B1 | 4/2002 | Skiba et al. |
| 6,389,427 B1 | 5/2002 | Faulkner |
| 6,393,582 B1 | 5/2002 | Klecka et al. |
| 6,397,242 B1 | 5/2002 | Devine et al. |
| 6,446,136 B1 | 9/2002 | Pohlmann et al. |
| 6,460,055 B1 | 10/2002 | Midgley et al. |
| 6,463,565 B1 | 10/2002 | Kelly et al. |
| 6,487,561 B1 | 11/2002 | Ofek et al. |
| 6,496,944 B1 | 12/2002 | Hsiao et al. |
| 6,502,133 B1 | 12/2002 | Baulier et al. |
| 6,519,612 B1 | 2/2003 | Howard et al. |
| 6,526,418 B1 | 2/2003 | Midgley et al. |
| 6,549,916 B1 | 4/2003 | Sedlar |
| 6,611,867 B1 * | 8/2003 | Bowman-Amuah .......... 709/224 |
| 6,625,623 B1 | 9/2003 | Midgley et al. |
| 6,629,109 B1 | 9/2003 | Koshisaka |
| 6,640,145 B2 * | 10/2003 | Hoffberg et al. ................. 700/83 |
| 6,670,974 B1 | 12/2003 | McKnight et al. |
| RE38,410 E * | 1/2004 | Hersch et al. ................. 709/203 |
| 6,751,753 B2 | 6/2004 | Nguyen et al. |
| 6,769,074 B2 | 7/2004 | Vaitzblit |
| 6,779,003 B1 | 8/2004 | Midgley et al. |
| 6,785,786 B1 | 8/2004 | Gold et al. |
| 6,807,550 B1 * | 10/2004 | Li et al. .......... 707/796 |
| 6,816,872 B1 | 11/2004 | Squibb |
| 6,823,336 B1 | 11/2004 | Srinivasan et al. |
| 6,826,711 B2 | 11/2004 | Moulton et al. |
| 6,836,756 B1 | 12/2004 | Gruber |

| | | |
|---|---|---|
| 6,839,721 B2 | 1/2005 | Schwols |
| 6,839,740 B1 * | 1/2005 | Kiselev .................. 709/214 |
| 6,847,984 B1 | 1/2005 | Midgley et al. |
| 6,907,551 B2 | 6/2005 | Katagiri et al. |
| 6,993,706 B2 | 1/2006 | Cook |
| 7,028,078 B1 * | 4/2006 | Sharma et al. ............ 709/214 |
| 7,039,663 B1 | 5/2006 | Federwisch et al. |
| 7,054,913 B1 * | 5/2006 | Kiselev .................. 709/214 |
| 7,069,579 B2 | 6/2006 | Delpuch |
| 7,080,081 B2 | 7/2006 | Agarwal et al. |
| 7,092,396 B2 | 8/2006 | Lee et al. |
| 7,096,392 B2 | 8/2006 | Sim-Tang |
| 7,200,233 B1 | 4/2007 | Keller et al. |
| 7,206,805 B1 * | 4/2007 | McLaughlin, Jr. ......... 709/203 |
| 7,207,224 B2 | 4/2007 | Rutt et al. |
| 7,272,613 B2 | 9/2007 | Sim et al. |
| 7,290,056 B1 * | 10/2007 | McLaughlin, Jr. ......... 709/230 |
| 7,325,159 B2 | 1/2008 | Stager et al. |
| 7,363,549 B2 | 4/2008 | Sim-Tang |
| 7,519,870 B1 | 4/2009 | Sim-Tang |
| 7,565,661 B2 | 7/2009 | Sim-Tang |
| 7,904,913 B2 | 3/2011 | Sim-Tang et al. |
| 8,060,889 B2 | 11/2011 | Sim-Tang |
| 2001/0029520 A1 | 10/2001 | Miyazaki et al. |
| 2001/0043522 A1 | 11/2001 | Park |
| 2001/0056362 A1 * | 12/2001 | Hanagan et al. ............ 705/7 |
| 2002/0022982 A1 | 2/2002 | Cooperstone et al. |
| 2002/0091722 A1 | 7/2002 | Gupta et al. |
| 2002/0107860 A1 | 8/2002 | Gobeille et al. |
| 2002/0144177 A1 | 10/2002 | Kondo et al. |
| 2002/0147807 A1 | 10/2002 | Raguseo |
| 2002/0172222 A1 * | 11/2002 | Ullmann et al. ........... 370/468 |
| 2002/0178397 A1 | 11/2002 | Ueno et al. |
| 2002/0199152 A1 | 12/2002 | Garney et al. |
| 2003/0004947 A1 * | 1/2003 | Coverston .................. 707/9 |
| 2003/0009552 A1 | 1/2003 | Benfield et al. |
| 2003/0051026 A1 * | 3/2003 | Carter et al. ............ 709/224 |
| 2003/0088372 A1 | 5/2003 | Caulfield |
| 2003/0117916 A1 | 6/2003 | Makela et al. |
| 2003/0200098 A1 | 10/2003 | Geipel et al. |
| 2003/0204515 A1 | 10/2003 | Shadmon et al. |
| 2003/0225825 A1 * | 12/2003 | Healey et al. ............. 709/203 |
| 2004/0010544 A1 * | 1/2004 | Slater et al. ............. 709/203 |
| 2004/0036716 A1 | 2/2004 | Jordahl |
| 2004/0047354 A1 * | 3/2004 | Slater et al. ............. 370/400 |
| 2004/0080504 A1 * | 4/2004 | Salesky et al. ........... 345/418 |
| 2004/0098458 A1 * | 5/2004 | Husain et al. ............ 709/204 |
| 2004/0098717 A1 * | 5/2004 | Husain et al. ............ 718/100 |
| 2004/0098728 A1 * | 5/2004 | Husain et al. ............ 719/313 |
| 2004/0098729 A1 * | 5/2004 | Husain et al. ............ 719/314 |
| 2004/0117715 A1 | 6/2004 | Ha et al. |
| 2004/0133487 A1 * | 7/2004 | Hanagan et al. ............ 705/34 |
| 2004/0193594 A1 | 9/2004 | Moore et al. |
| 2004/0199486 A1 * | 10/2004 | Gopinath et al. ........... 707/1 |
| 2004/0250212 A1 | 12/2004 | Fish |
| 2005/0001911 A1 | 1/2005 | Suzuki |
| 2005/0021690 A1 | 1/2005 | Peddada |
| 2005/0076066 A1 | 4/2005 | Stakutis et al. |
| 2005/0166179 A1 | 7/2005 | Vronay et al. |
| 2005/0240592 A1 * | 10/2005 | Mamou et al. ............. 707/9 |
| 2005/0251540 A1 | 11/2005 | Sim-Tang |
| 2005/0262097 A1 | 11/2005 | Sim-Tang et al. |
| 2005/0262188 A1 * | 11/2005 | Mamou et al. ............ 709/203 |
| 2005/0286440 A1 | 12/2005 | Strutt et al. |
| 2006/0020586 A1 | 1/2006 | Prompt et al. |
| 2006/0026220 A1 | 2/2006 | Margolus |
| 2006/0050970 A1 | 3/2006 | Gunatilake |
| 2006/0064416 A1 | 3/2006 | Sim-Tang |
| 2006/0101384 A1 | 5/2006 | Sim-Tang et al. |
| 2006/0130002 A1 | 6/2006 | Hirayama et al. |
| 2006/0137024 A1 | 6/2006 | Kim et al. |
| 2006/0236149 A1 | 10/2006 | Nguyen et al. |
| 2006/0259820 A1 | 11/2006 | Swoboda |
| 2006/0278004 A1 | 12/2006 | Rutt et al. |
| 2007/0067278 A1 | 3/2007 | Borodziewicz et al. |
| 2007/0094312 A1 | 4/2007 | Sim-Tang |
| 2007/0168692 A1 | 7/2007 | Quintiliano |
| 2007/0214191 A1 | 9/2007 | Chandrasekaran |
| 2008/0256138 A1 | 10/2008 | Sim-Tang |
| 2010/0146004 A1 | 6/2010 | Sim-Tang |
| 2011/0185227 A1 | 7/2011 | Sim-Tang |
| 2011/0252004 A1 | 10/2011 | Sim-Tang |
| 2011/0252432 A1 | 10/2011 | Sim-Tang et al. |

FOREIGN PATENT DOCUMENTS

| | | |
|---|---|---|
| WO | WO-02/25443 A1 | 3/2002 |
| WO | WO-03060774 A1 | 7/2003 |

OTHER PUBLICATIONS

U.S. Appl. No. 12/488,657, Sim-Tang.
U.S. Appl. No. 10/862,971, Sim-Tang.
U.S. Appl. No. 10/862,971.
U.S. Appl. No. 11/185,168, Sim-Tang.
U.S. Appl. No. 11/185,313, Siew Yong Sim-Tang.
U.S. Appl. No. 12/099,837, Sim-Tang, Siew-Yong.
Housel et al. "WebExpress: A client/intercept based system for optimizing Web browsing in a wireless environment", Mobile Network and Applications, vol. 3, pp. 419-431, 1998, Baltzer Science Publishers.
Psounis, "Class-based Delta-encoding: A Scalable Scheme for Caching Dynamic Web Content", Proceedings of the 22nd International Conference on Distributed Computing Systems Workshops, 2002 IEEE (pp. 1-7).
Microsoft Windows Storage Server 2003, NSI Software, "Improving Business Continuity Using Windows Storage Server 2003", White Paper, Oct. 2003, pp. 1-15.
Burton H. Bloom, Space/Time Trade-offs in Hash Coding with Allowable Errors, Communications of the ACM, vol. 13/No. 7/Jul. 1970, pp. 422-426.
Beausoliel, Rob, "International Search Report" for PCT/US05/15651 as mailed Sep. 29, 2005. (1 page).
Abel-Jalil, Neveen, "International Search Report" for PCT/US05/32958 as mailed Jul. 8, 2008. (1 page).
Thomson, William, "International Search Report" for PCT/US05/39709 as mailed Oct. 16, 2007. (1 page).
Vo, Tim, "International Search Report" for PCT/US05/15662 as mailed Feb. 1, 2008. (2 pages).
Zhen, Li B., "International Search Report" for PCT/US05/15653 as mailed Nov. 30, 2006. (3 pages).
U.S. Appl. No. 12/696,691, Sim-Tang.
U.S. Appl. No. 12/845,215, Sim-Tang.
U.S. Appl. No. 12/901,824, Siew Yong Sim-Tang.
U.S. Appl. No. 12/901,888, Siew Yong Sim-Tang.
Plagemann, Thomas, Towards Middleware Services for Mobile ADHOC Network Applications, May 2003, IEEE (FTDCS'03), pp. 1-7.

* cited by examiner

DMS Data Services

Data Protection (with Upload) and Data Distribution

Data Replication

Data Distribution (Subsequent Setup)

Data Copy

Data Recovery – Original Data Source

Data Recovery – Host Server Switch-over

Data Recovery – Host Server and DMS Region Switch-over

Data Protection – Clustered Data Source

Data Protection – Compound Data Source

Hierarchical Data Management

ObjectClass: <a 128 bit file object class identifier>
ObjGUID: <a 128 bit unique identifier for this object>
Creator: <a user identifier>
ExternalCreationDateTime: <a time stamp>
DMSCreationDateTime: <a time stamp>
Name: <a string>
ParentObject: <a GUID of a directory object>
ACL: <an object GUID>
Version: <integer or time stamp>
Size: <integer>
ExternalModifiedDateTime:<a time stamp>
DMSModifiedDateTime:<a time stamp>
DMSTerminationDateTime: <a time stamp>
ModifiedBy: <a user identifier>
Company: <a string>
Department: <a string>
Title: <a string>
Subject: <a string>
Keywords: <a string>
Comments: <a string>
Content: <a random binary blob>

Figure 17

| Property Type | Description |
| --- | --- |
| Integer | a number |
| String | a Text string |
| GUID | a 128bit global unique ID across all DMS nodes. This property store the GUID of another object that allows objects to be linked. |
| Constant | a set of related unique numbers that represent some specific information |
| Random access binary blob | Binary data for random access |
| Sequential access binary blob | Sequential records |
| Boolean | True/false |
| ComplexType | Combination of one or more of the above |

Figure 18

| Property attributes | Default | Description |
|---|---|---|
| Modifiable | True | Property once created, can be modified by an internal or external request |
| Modifiable-internal | True | Property once created, can be only be modified by the DMS internally |
| Read-able | True | Property can be accessed by external request |
| Version-able | True | Property can be versioned. For example, modification-date-time is a version-able property. |
| Multi-value | False | If Multi-value is True, the property has many values. For example, the children property of a directory object is a multi-value property. If Multi-value is False, the property is single value property. Single value is the default of all property. |
| Inheritable | False | If True, when object receives a request for the property, and if the property is not set, the object can request for the value from its parent in the object hierarchy. For example, a file object may request for a value from its directory object. By default, all properties are not inheritable. |
| Index | False | If True, the DMS automatically index the property. Once indexed, the object can be searched using the index of the property. The indexed property are name, fingerprint, etc. By default, a property is not indexed. If a property is not indexed, it is still searchable by an algorithm iterating through all the objects. |
| Replicate-able | True | If Replicate-able is True, then when the associated property is replicated when the object is replicated. |

Figure 19

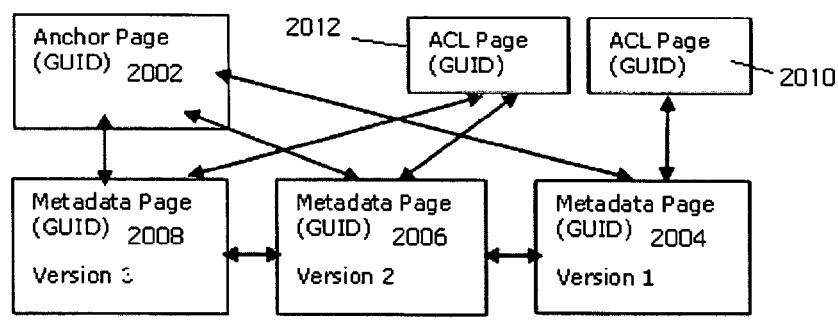

Data Structure of a simple object instance

Figure 20

An example of a directory object instance an example of a File object instance

DMS Object Instance Hierarchy

SYSTEM FOR MOVING REAL-TIME DATA EVENTS ACROSS A PLURALITY OF DEVICES IN A NETWORK FOR SIMULTANEOUS DATA PROTECTION, REPLICATION, AND ACCESS SERVICES

This application is based on and claims priority from U.S. Provisional Application Ser. No. 60/569,164, filed May 7, 2004.

BACKGROUND OF THE INVENTION

1. Technical Field

The present invention relates generally to enterprise data management.

2. Background of the Related Art

A critical information technology (IT) problem is how to cost-effectively deliver network wide data protection and rapid data recovery. In 2002, for example, companies spent an estimated $50B worldwide managing data backup/restore and an estimated $30B in system downtime costs. The "code red" virus alone cost an estimated $2.8B in downtime, data loss, and recovery. The reason for these staggering costs is simple—traditional schedule based tape and in-storage data protection and recovery approaches can no longer keep pace with rapid data growth, geographically distributed operations, and the real time requirements of 24×7×265 enterprise data centers.

Although many enterprises have embarked on availability and recovery improvement programs, many of these programs have been focused on the redundancy of infrastructure, not on the data itself. Yet, without data availability, applications cannot be available.

Today's legacy data protection and recovery solutions are highly fragmented across a wide variety of applications, systems, and storage models. The overhead and data management maze that existing approaches bring to the network, storage, tape, and application infrastructure has caused increasing expenditures with little tangible returns for the enterprise. Worse, manual recovery techniques compound the problem with the same issues that cause downtime in the first place—human errors and process issues constitute 80% of unplanned downtime.

As a result, businesses are enduring high costs, high risk, and a constant drag on productivity. A recent survey by Aberdeen highlights IT managers' top data storage problems: managing backup and restore (78%), deploying disaster recovery (80%), and delivering required service levels (60%). The present invention addresses this long felt need.

BRIEF SUMMARY OF THE INVENTION

A data management system or "DMS" provides a wide range of data services to data sources associated with a set of application host servers. The data management system typically comprises one or more regions, with each region having one or more clusters. A given cluster has one or more nodes that share storage. To facilitate the data service, a host driver embedded in an application server connects an application and its data to a cluster. The host driver provides a method and apparatus for capturing real-time data transactions in the form of an event journal that is provided to the data management system. The driver functions to translate traditional file/database/block I/O into a continuous, application-aware, output data stream. Using the streams generated in this manner, the DMS offers a wide range of data services that include, by way of example only: data protection (and recovery), disaster recovery (data distribution and data replication), data copy, and data query and access. The data services and, in particular, data protection and disaster recovery, are data services where meaningful application and data events are forwarded from one end point to another end point continuously as a stream. More generally, according to the invention, a stream-based data service is a service that involves two end points sending a stream of real-time application and data events.

The present invention addresses enterprise data protection and data management problems by continuously protecting all data changes and transactions in real time across local and wide area networks. Preferably, the method and system of the invention take advantage of inexpensive, commodity processors to efficiently parallel process and route application-aware data changes between applications and low cost near storage.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 17 illustrates a list of representative properties for a DMS active object;

FIG. 18 is a table of possible property types for a DMS active object;

FIG. 19 is a table of possible attributes for each DMS active object property;

FIG. 20 illustrates an object data structure for tracking data history;

DETAILED DESCRIPTION OF AN EMBODIMENT

Figure 1:
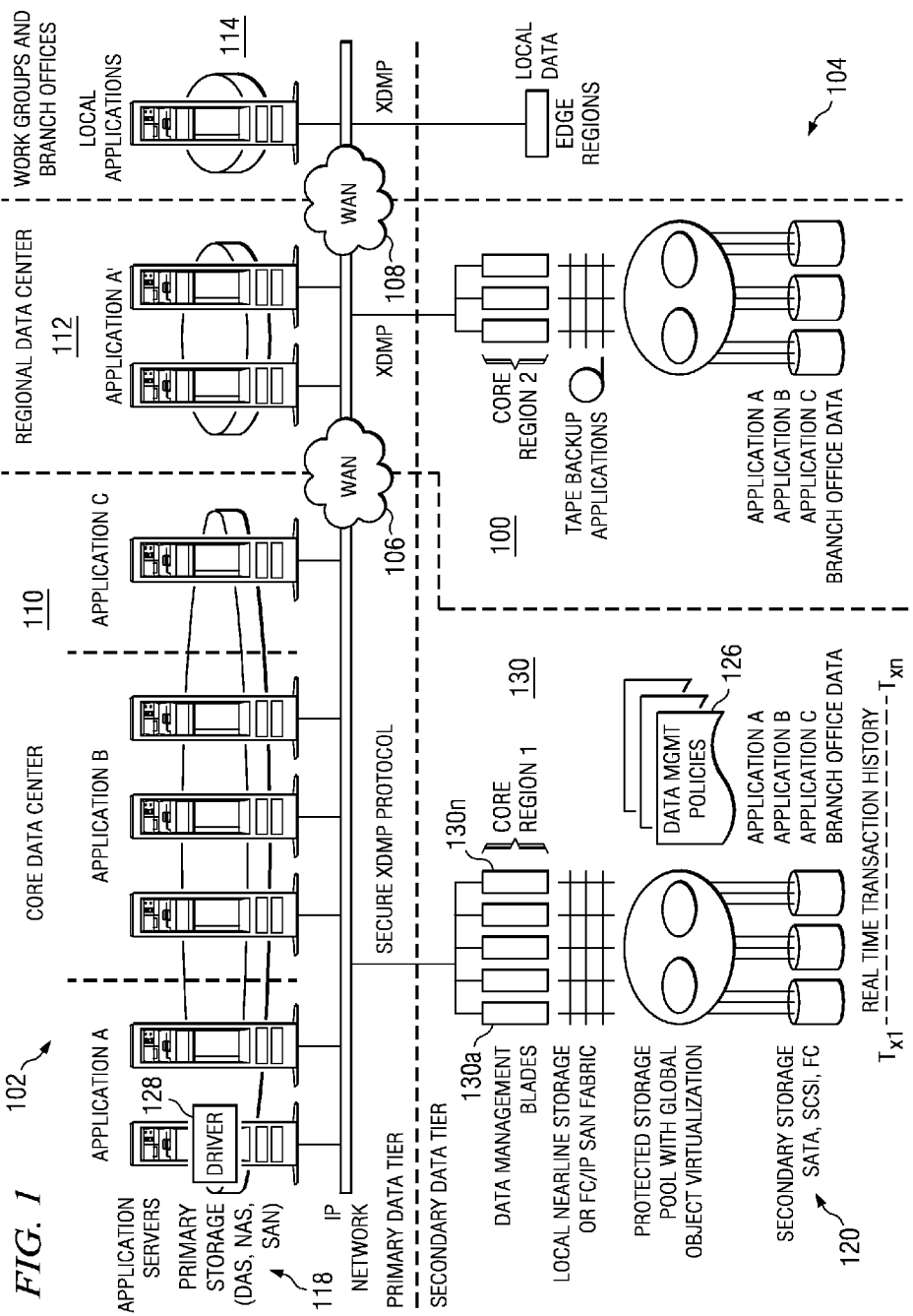
FIG. 1 is an illustrative enterprise network in which the present invention may be deployed.

FIG. 1 illustrates a representative enterprise 100 in which the present invention may be implemented. This architecture is meant to be taken by way of illustration and not to limit the applicability of the present invention. In this illustrative example, the enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fiber Channel (FC or the like), or iSCSI. The data management server nodes create a logical layer that offers object virtualization and protected data storage. The secondary data tier is interconnected to the primary data tier, preferably through one or more host drivers (as described below) to provide real-time data services. Preferably, and as described below, the real-time data services are provided through a given I/O protocol for data transfer. Data management policies 126 are implemented across the secondary storage in a well-known manner. A similar architecture is provided in data center 112. In this example, the regional office 114 may not have its own secondary storage, but relies instead on the facilities in the primary data centers.

According to the invention, a "host driver" 128 is associated with one or more of the application(s) running in the application servers 116 to transparently and efficiently capture the real-time, continuous history of all (or substantially all) transactions and changes to data associated with such application(s) across the enterprise network. As will be described below, the present invention facilitates real-time, so-called "application aware" protection, with substantially no data loss, to provide continuous data protection and other data services (described in more detail below) including, without limitation, data distribution, data replication, data copy, data access, and the like. In operation, a given host driver 128 intercepts data events between an application and its primary data storage, and it may also receive data and application events directly from the application and database. In a representative embodiment, the host driver 128 is embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130*a-n* that cooperate with the host drivers 128 to facilitate the data services. In this illustrative example, the data center 110 supports a first core region 130, and the data center 112 supports a second core region 132. A given data management server 130 is implemented using commodity hardware and software (e.g., an Intel processor-based blade server running Linux operating system, or the like) and having associated disk storage and memory. Generalizing, the host drivers 128 and data management servers 130 comprise a data management system (DMS) that provides potentially global data services across the enterprise.

Figure 2:
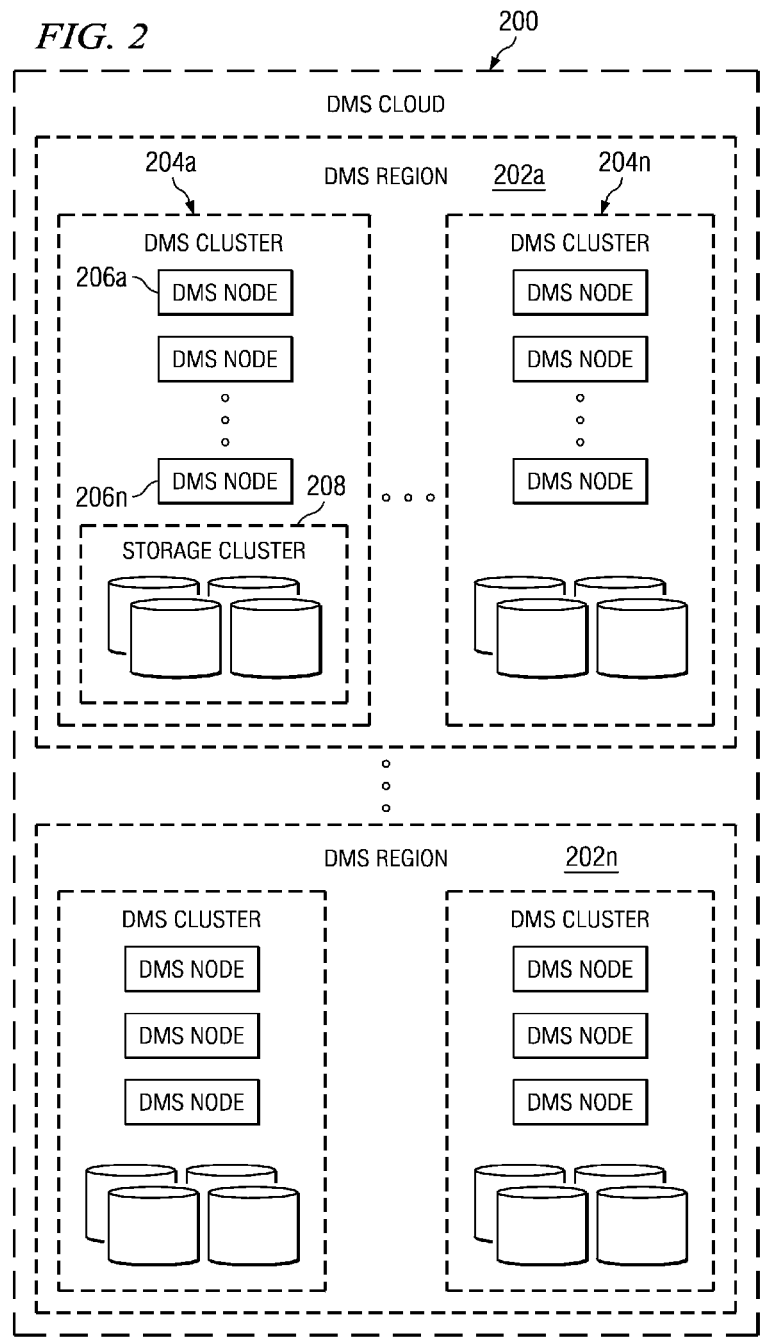
FIG. 2 is an illustration of a general data management system (DMS) of the present invention.

FIG. 2 illustrates a preferred hierarchical structure of a data management system 200. As illustrated, the data management system 200 comprises one or more regions 202*a-n*, with each region 202 comprising one or more clusters 204*a-n*. A given cluster 204 includes one or more nodes 206*a-n* and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be redirected to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
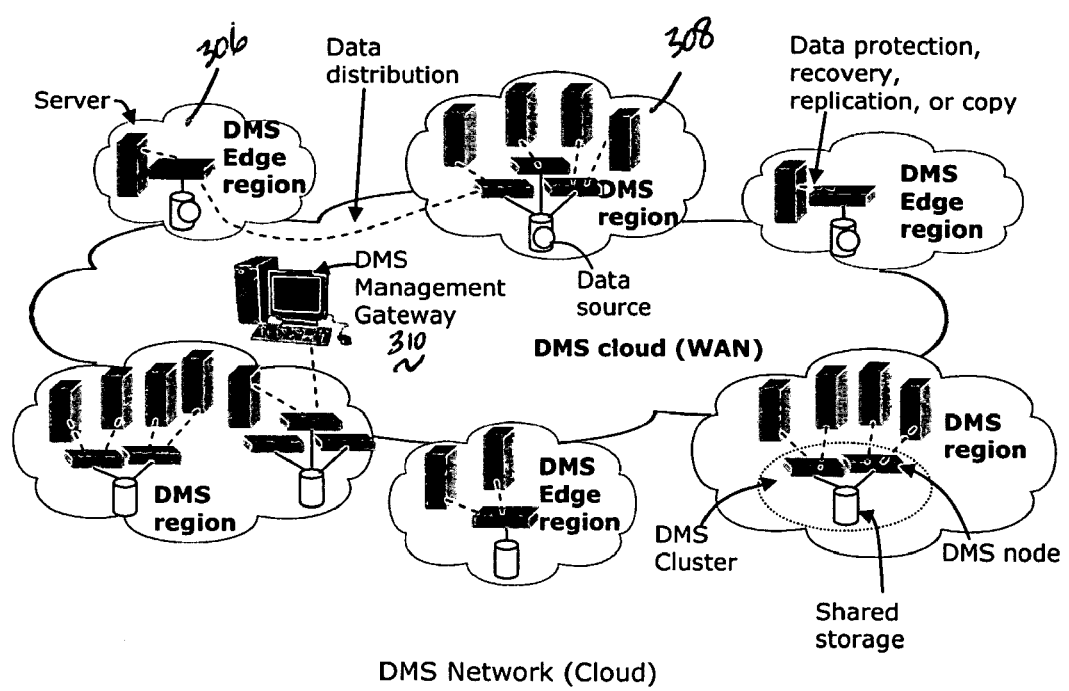
FIG. 3 is an illustration of a representative DMS network according to one embodiment of the present invention.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes a management gateway 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS cluster captures a range of history and continuous changes of, for example, an external data source in a host server. A data source may reside in one cluster, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand caching to bring in the data.

Figure 4:
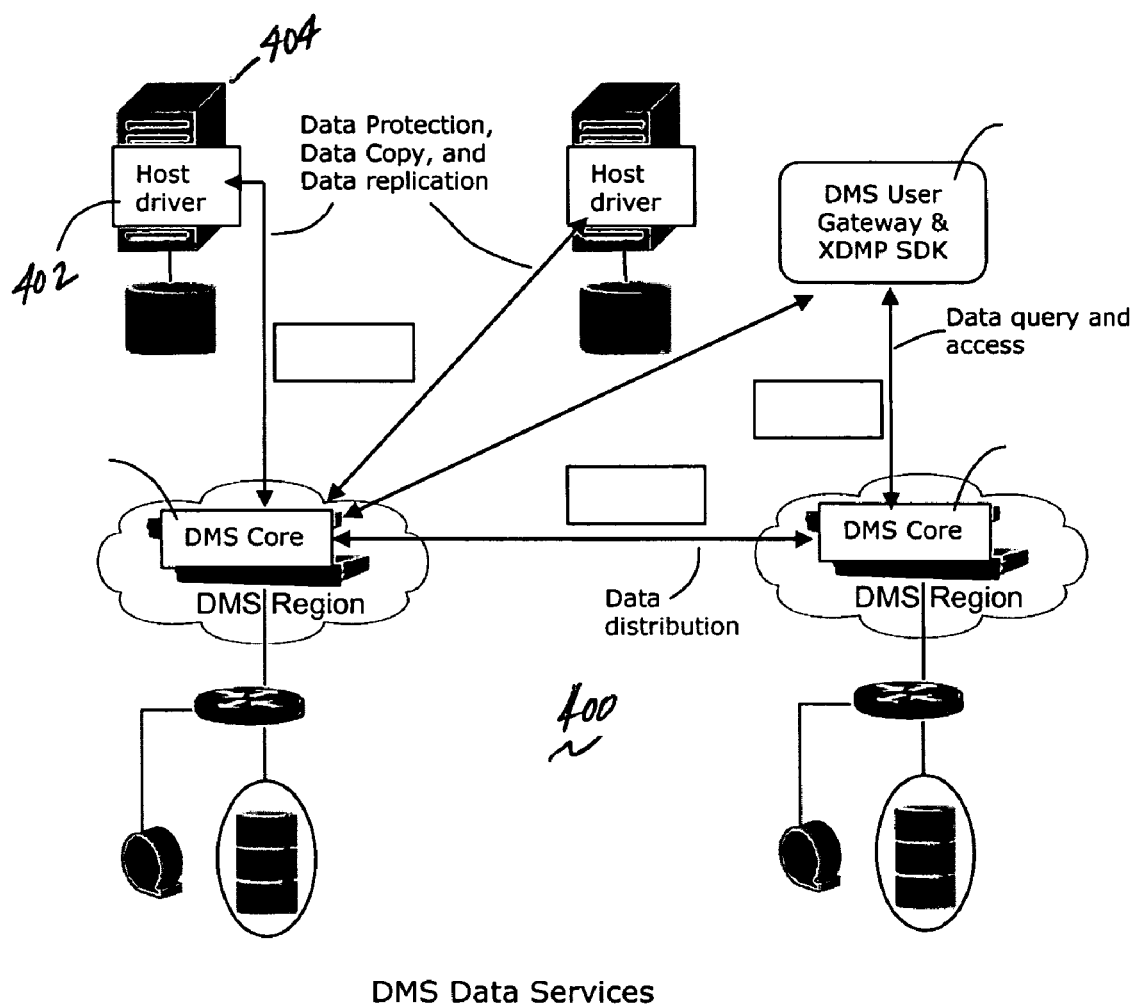
FIG. 4 illustrates how a host driver of the data management system may be used to provide a continuous "event journal" data stream to facilitate one or more data services.

Referring now to FIG. 4, an illustrative DMS network 400 provides a wide range of data services to data sources associated with a set of application host servers. As noted above, and as will be described in more detail below, the DMS host driver 402 embedded in an application server 404 connects the application and its data to the DMS cluster. In this manner, the DMS host drivers can be considered as an extension of the DMS cloud reaching to the data of the application servers. The host driver provides a method and apparatus for capturing real-time data transactions in the form of an event journal that is provided to the data management system. In particular, the driver functions to translate traditional file/database/block I/O into a continuous, application-aware, output data stream.

Application aware event journaling is a technique to create real-time data capture so that, among other things, consistent data checkpoints of an application can be identified and metadata can be extracted. For example, application awareness is the ability to distinguish a file from a directory, a volume from a directory, a journal file from a control or binary raw data file, or to know how a file, a volume, or a directory object is modified by a given application. Thus, when protecting a general purpose file server, an application aware solution is capable of distinguishing a file from a directory, and of identifying a consistent file checkpoint (e.g., zero-buffered write, flush or close events), and of interpreting and capturing file system object attributes such as an access control list. By interpreting file system attributes, an application aware data protection may ignore activities applied to a temporary file. Another example of application awareness is the ability to identify a group of related files, directories or raw volumes that belong to a given application. Thus, when protecting a database with an application aware solution, the solution is capable of identifying the group of volumes or directories and files that make up a given database, of extracting the name of the database, and of distinguishing journal files from binary table files and control files. It also knows, for example, that the state of the database journal may be more current than the state of the binary tables of the database in primary storage during runtime. These are just representative examples, of course. In general, application aware event journaling tracks granular application consistent checkpoints; thus, when used in conjunction with data protection, the event journal is useful in reconstructing an application data state to a consistent point-in-time in the past, and it also capable of retrieving a granular object in the past without having to recover an entire data volume.

Using the streams generated in this manner, the DMS offers a wide range of data services. As illustrated in FIG. 4, the data services include, by way of example only: data protection (and recovery), disaster recovery (data distribution and data replication), data copy, and data query and access. The data services and, in particular, data protection and disaster recovery, preferably are stream based data services where meaningful application and data events are forwarded from one end point to another end point continuously as a stream. More generally, according to the invention, a stream-based data service is a service that involves two end points sending a stream of real-time application and data events. For data protection, this means streaming data from a data source (e.g., an external host server) into a DMS cluster, where the data source and its entire history can be captured and protected. Data distribution refers to streaming a data source from one DMS cluster into another DMS cluster, while data replication refers to streaming a data source from a DMS cluster to another external host server. Preferably, both data distribution and data replication are real-time continuous movement of a data source from one location to another to prepare for disaster recovery. Data replication differs from data distribution in that, in the latter case, the data source is replicated within the DMS network where the history of the data source is maintained. Data replication typically is host based replication, where the continuous events and changes are applied to the host data such that the data is overwritten by the latest events; therefore, the history is lost. Data copy is a data access service where a consistent data source (or part of a data source) at any point-in-time can be constructed and retrieved. This data service allows data of the most current point-in-time, or a specific point-in-time in the past, to be retrieved when the data is in a consistent state.

Another data service that is provided through the present invention is long term archive management. Long term archive management is a policy based service where the protected data sources are managed automatically within the DMS network. One or more management policies may be implemented, for example, a policy based on the retention period of obsolete data, a policy based on the maximum retention history of living data, a policy based on change tracking of given data, or policies based on data subscription, archive relocations, on-going verification, and the like.

Another data service is hierarchical data management. This is another policy based service that includes, for example, relocation of data between a host server and the DMS clusters. For example, a given data set that exists in a DMS cluster and is not accessed in a host server for a long time period may be temporarily removed from the host server until it is requested.

Data life-cycle management is yet another policy based service wherein data sources are managed automatically and programmatically in the DMS network and the host application servers. In this data service, a rule may be configured for a program to be triggered upon an event, e.g., when a given file is being accessed at a primary host server. Or, a rule may be configured for given data to be copied from one host server to another host server when the data is being modified. Of course, these are merely representative examples.

The DMS may also be used to provide an auditing service. In particular, as described herein the DMS captures, stores and indexes all data changes and application events in real-time. Thus, given events, such as the opening of a data object by a user (with a credential), the modification of a data object, the closing of a data object, data object checkpoints, and the like, are stored in the DMS back-end and facilitate a robust auditing capability. Thus, the DMS (e.g., through its management interface) can be used to identify an individual and the individual's actions with respect to the data object at a given time or during a given time period.

Thus, according to the invention, the DMS provides these and other data services in real-time with data and application awareness to ensure continuous application data consistency and to allow for fine grain data access and recovery. To offer such application and data aware services, the DMS has the capability to capture fine grain and consistent data. As will be illustrated and described, a given DMS host driver uses an I/O filter to intercept data events between an application and its primary data storage. The host driver also receives data and application events directly from the application and database.

The following section provides further details about the DMS of the present invention in connection with several of the above-described data services.

As described above, data protection is a data service a DMS network provides to a host server. A particular host application data source is protected by a DMS cluster with the host driver performing data upload and simultaneously streaming application event journals to the DMS cluster. A DMS node in the cluster receives the data and arranges the data in a form that allows for instance access to the data at any point-in-time in the past.

As also described above, data recovery is a data service the DMS network provides to a host server; in particular, this service is useful for recovering original host server application data. Data recovery is one particular phase or a specific process of data protection when the protected data needs to be adjusted, either to the same host server (where the data is being protected) or to a new host server (in the case when the original host server has failed). Prior to data recovery, the DMS re-adjusts the protected data in the DMS storage by moving the particular point-in-time data to be recovered forward to a most current point-in-time. The host driver then pulls the recovered data set from the DMS cluster into the host server storage while simultaneously allowing the application to read and write its data. If a segment of data is not yet recovered when the application requests it, the host driver moves that segment of data into the host immediately. While recovering the data source, the host driver simultaneously streams the application event journals to the DMS without application downtime.

Typically, data protection has many different phases. In one phase, the host driver is uploading a baseline data source while protecting the data source simultaneously. Once the upload is completed, in the next phase, the host driver is simply protecting the data source. If the DMS node fails, or if there is a network failure, or if the host server fails, the host driver performs data resynchronization with the DMS network, while simultaneously protecting the data source. If the data is corrupted in the host, the host driver acts to recover the host data while protecting the data. Once resynchronization or recovering is completed, the host driver returns to the regular protection phase.

As also described above, data distribution is a data service that the DMS network provides for disaster recovery. As noted above, a DMS cluster moves data from one DMS region to another DMS region to increase data reliability. Preferably, data distribution is based on data subscription; a remote DMS region subscribes for a protected data source from another region to make a replica. The data stream for the data distribution service preferably is similar to the data stream for data protection. Indeed, the behavior of the source DMS node for data distribution preferably is similar to that of the host driver for data protection; namely, a baseline data source must be populated while continuous events are forwarded from the source node to the target node. Recovery and resynchronization is also part of the data distribution service when failure occurs.

The DMS network also provides global data indexing; therefore, access to a replica copy of protected data in the DMS network is the same as access to the original copy of the data. In the event of a network failure, a data set can be accessed as if the network is intact if the data is distributed.

Data replication has been described above as another data service the DMS network provides to a host server. This data service allows a host server to continuously receive a latest data set from another host server. This service is also based on data subscription; in particular, the host server, via a host driver, is subscribed to given protected data in the DMS network. Once subscribed, an initial copy along, with the continuous events journal with changes, are pushed from the DMS network to the host driver in the host server. The host driver assembles the data into the local storage accordingly. The data stream in this case is also similar to the data stream produced by the data protection service.

In a stream-based data service such as provided by the present invention, a stream may be interrupted due to network or node failure. The DMS nodes and the host drivers preferably manage transfer failure with two levels of re-synchronization. In the event the failure duration is short, the two end points (which could be a host driver and a DMS node, or a DMS node and another DMS node) perform a stream re-synchronization. A stream based resynchronization involves lining up the stream checkpoints on both the receiving and sending ends when connectivity resumes. This ensures that no request is processed twice, and no request is missing. In the event the failure duration is too long (such that, for example, a stream queue is overflowed), the two end points iterate over their data and perform a comparative synchronization when connectivity resumes. Comparative resynchronization is a more expensive process as compared to stream resynchronization. During the comparative synchronization, the DMS end points continue to perform their regular data service, e.g., by continuously forwarding the necessary event journals.

The DMS network is capable of providing both synchronous and asynchronous data services. Typically, a synchronous data protection guarantees that there is no data loss. A synchronous data stream typically contains both "pre-events" (opening, modifying, and the like) and "post events" (such as "commit" or "rollback"). An asynchronous data stream typically only contains post-events ("opened," "updated" or the like) where all events are successfully completed events. An asynchronous data service only produces an asynchronous data stream, while a synchronous service may produce a mixture of both asynchronous and synchronous events. For example, protecting a database asynchronously involves streaming all events asynchronously from a host to a DMS node. Protecting a database synchronously typically means streaming the transaction events synchronously, and outputting all other events asynchronously.

In addition, preferably the DMS network also performs bandwidth throttling during data streaming to control resource utilization.

The following paragraphs describe representative data service scenarios as offered by a DMS network. FIGS. 5-16 illustrate these scenarios.

Figure 5:
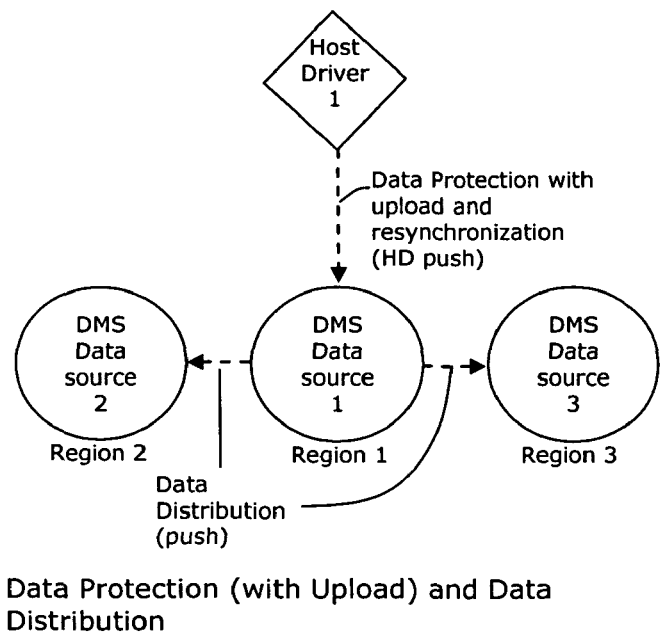
FIGS. 5-16 illustrate representative data services provided through the DMS.

In FIG. 5, a data source in a host server is protected by the Host Driver 1 that resides in the application server. Host driver 1 must upload the entire data source while protecting it at the same time, typically by forwarding all the on-going data and application events to the DMS node to which it connects. In this example, the data is captured in DMS Data Source 1 at DMS Region 1 in the DMS storage cluster of the DMS node.

Assume now that the data source is pre-configured to distribute data to two different DMS regions. To this end, two replicas are created, namely: DMS data source 2 and DMS data source 3. As seen in FIG. 5, the upload events and the real time data and application events are continuously pushed from DMS data source 1 to DMS data sources 2 and 3 using the data distribution service.

In the event the DMS node to which the Host Driver 1 is connected fails, or if the network connectivity between Host Driver 1 and DMS Data source 1 fails, there would be a blackout period during which data and application events cannot be forwarded from the Host Driver 1 to the DMS network. When the connectivity resumes, or when DMS node recovers (or otherwise fails-over), Host Driver 1 performs a stream or a comparative resynchronization with the DMS Data Source 1, and it also simultaneously forwards the on-going data and application events to the DMS Data Source 1.

Figure 6:
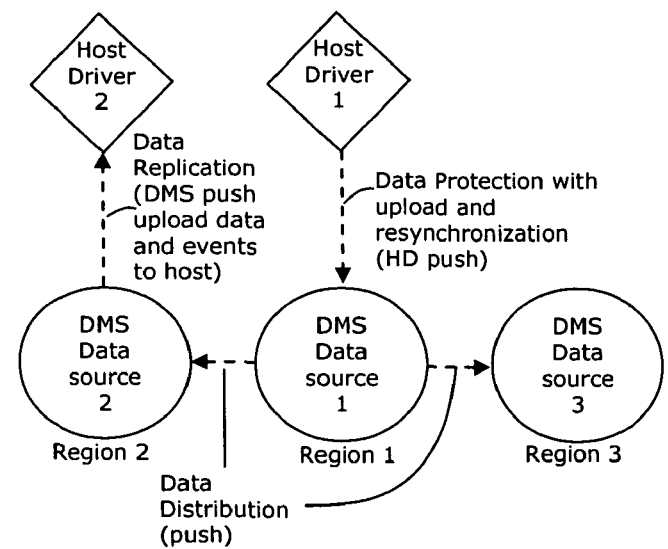

In a next scenario, suppose DMS Data source is subscribed by host driver 2 at a second host server at a later time. This scenario is illustrated in FIG. 6. Here, the DMS Data source 2 pushes to the second host a full copy of the most recent data and on-going data events. This process is similar to the initial upload and protection process of Host Driver 1. After Host Driver 2 receives the entire data, only the on-going data events are subsequently forwarded. In the DMS network, preferably data replication is similar to data distribution except that replication means moving data and events to an external host server where events and changes are instantly applied to the host data (instead of a DMS cluster to cluster distribution where events and changes are accumulated as a history). Thus, as mentioned above, preferably the process used in data distribution (and data replication) is identical to that used in the data protection service, with just different endpoints.

Figure 7:
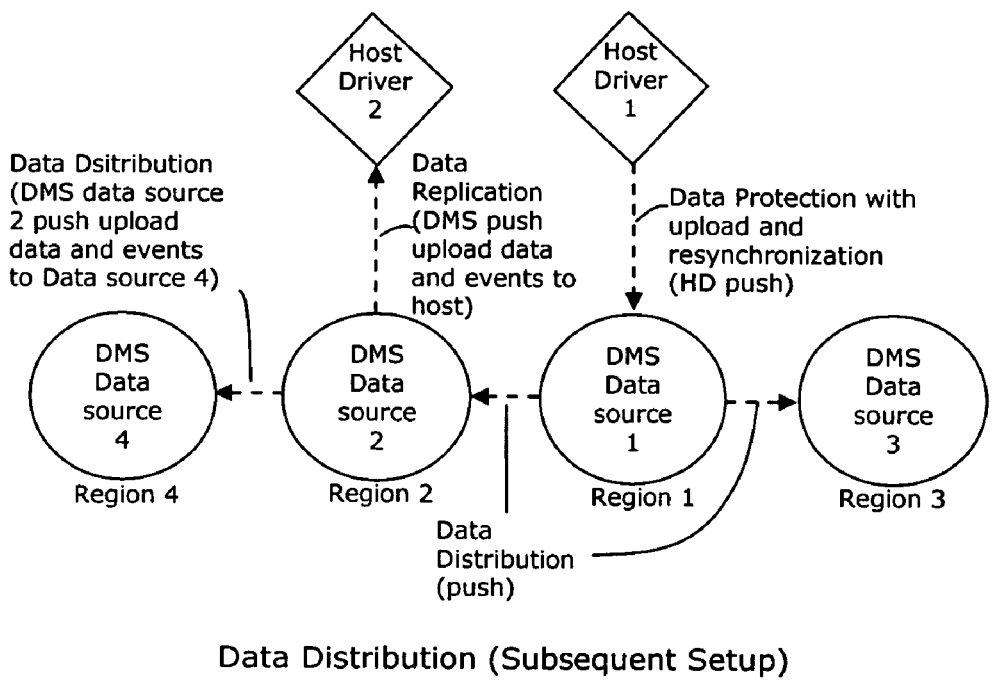

In the next scenario, as illustrated in FIG. 7, Data Source 2 is subscribed by yet another region, and as a result DMS Data Source 4 is created. Because there is already a full copy of data in DMS Data source 2, an upload of the full copy of the most recent data, together with on-going data events, are pushed to DMS Data Source 4. Again, preferably this process is similar to the data movement from DMS Data Source 2 to Host Driver 2. It is also similar to Host Driver 1 moving data to DMS Data Source 1.

Figure 8:
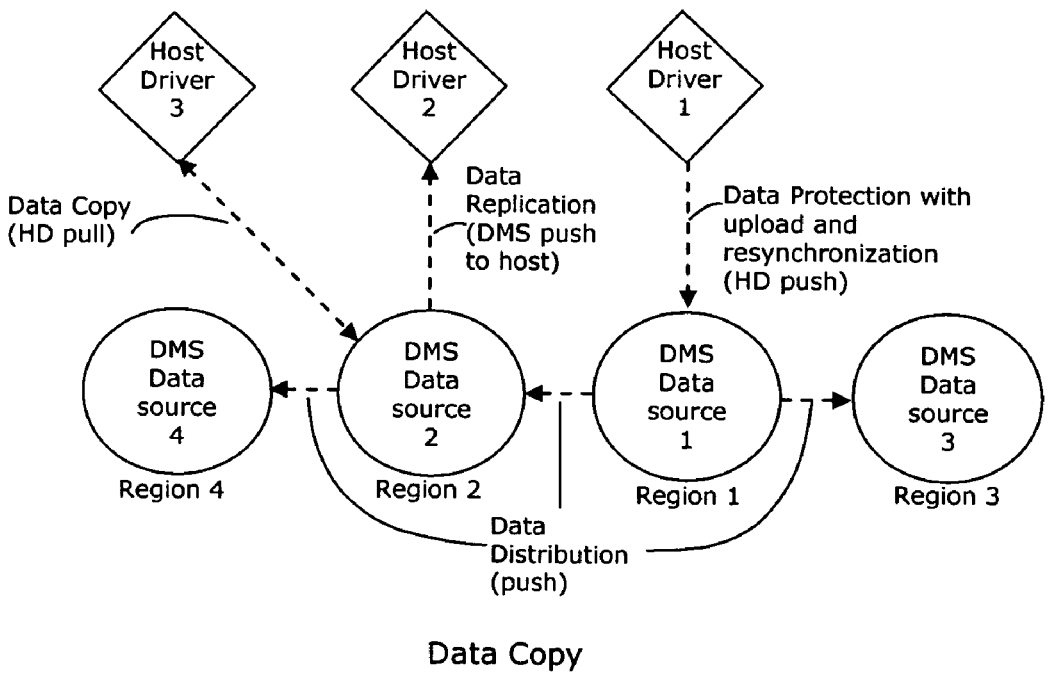

In the following scenario, as illustrated in FIG. 8, Host Driver 3 is making a specific point-in-time copy of the protected data source; it can either copy the full data source or a subset of the data source. For example, the requested data may be an entire protected file system folder, a directory, a file, or a transaction record of a protected database. The Host Driver 3 may get the data source from any one of the DMS regions, and it does not (and need not) know the location of the data source. As illustrated, the Host Driver 3 connects to the DMS network and requests the data, and it may be redirected to any DMS cluster that has the data. Because the history of the protected data source is stored in the DMS cluster, the Host Driver 3 must indicate a specific point-in-time or data version number for the copy. The Host Driver 3 pulls (reads) the data and re-constructs the data in its host server. Applications may immediately access the data that is copied in by Host Driver 3. When requests for data (that has not yet been copied into the host) arrive, Host Driver 3 instantly recovers that requested data. This "instant copy" behavior allows IT administrators or others to test a new version of an application (in other words, to provide change management) during an upgrade without having to wait for an entire data set to be fully copied.

When the copy process is completed, preferably Host Driver 3 disconnects from the DMS network.

Data copy can also be used for recovering a data source. For example, assume a new host is used as a copy target. Once data is copied to the new host, that host can be switched to become the new origin of the data source if an IT administrator (or other) desires to recover the data source to the copied point-in-time. When the new host is switched to become the new origin, preferably the new host's Host Driver immediately synchronizes its data state to that in the DMS.

Figure 9:
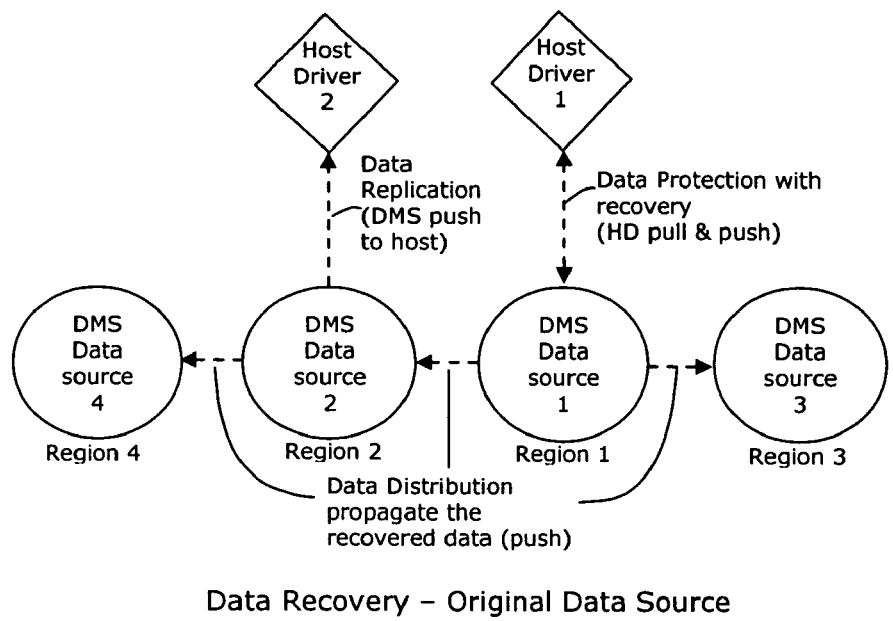

Because the DMS data sources preferably keep the history of the protected data source, when the original data source is corrupted, it can be recovered to a previous consistent stage. In this example, DMS Data source 1 adjusts its history by creating a new version that matches the state of a past point-in-time to be recovered. The next scenario, as illustrated in FIG. 9, shows that the Host Driver 1 pulls the recovered point-in-time into the host server while simultaneously forwarding the on-going data and application events to the DMS Data Source 1. This scenario illustrates how data recovery can be considered as part of the data protection process.

Figure 10:
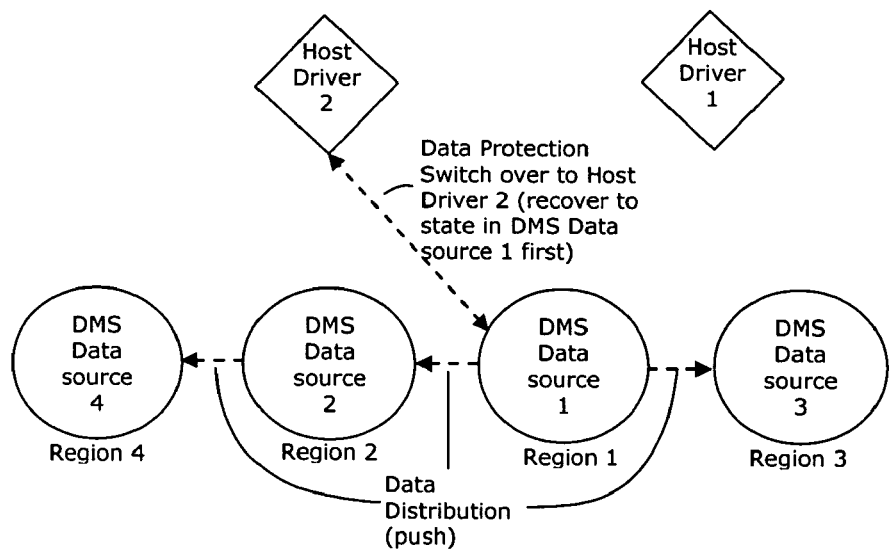

FIG. 10 illustrates a scenario when the host server on which Host Driver 1 resides fails. In this case, the host server of the Host Driver 2 may be turned into the primary application server. In particular, the Host Driver 2 takes the responsibility of recovering its state to match that of the DMS Data source 1 and forwards the data and application events to the DMS Data Source 1. The Host Driver 2 subscription to DMS Data Source 2 would be terminated.

Figure 11:
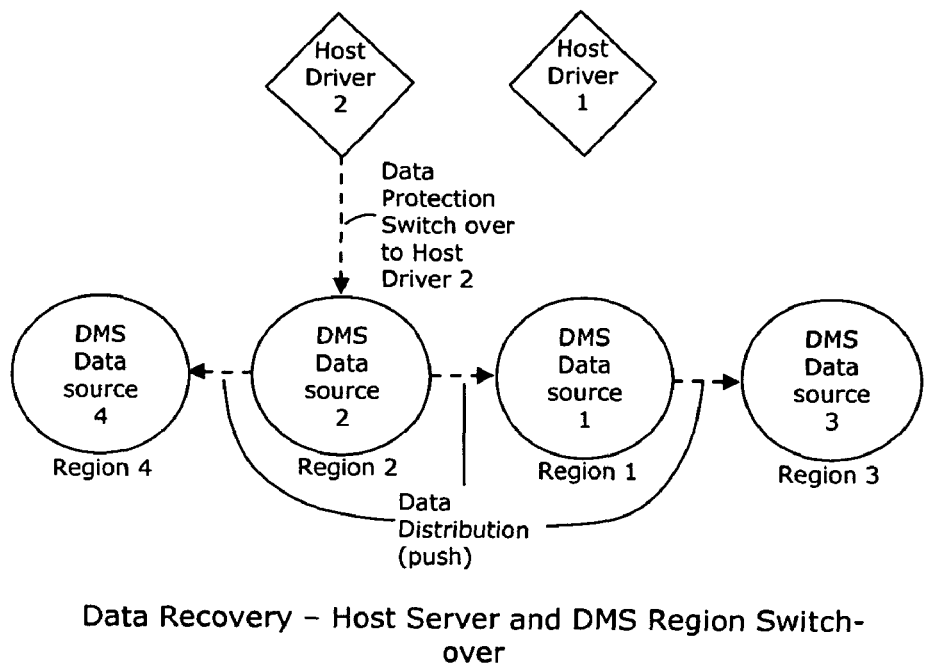

Alternatively, another scenario is that the host server of the Host Driver 2 is configured to be new primary application server while the DMS Data Source 2 is configured to be the new DMS master source. This scenario is shown in FIG. 11. In this scenario, the data subscription can be adjusted with Host Driver 2 performing comparative resynchronization with DMS Data Source 2, DMS Data Source 2 performing comparative resynchronization with DMS Data sources 1 and 4, and so on. This scenario can be useful in the event of disaster recovery when a secondary region is switched over to become the primary region.

Figure 12:
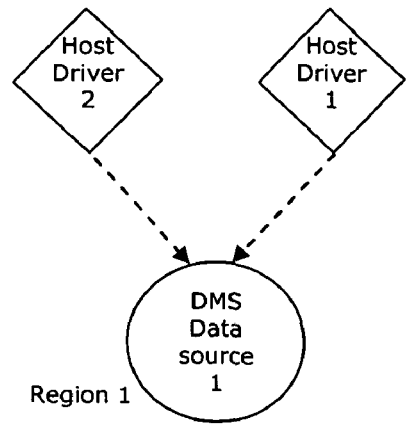

The next scenario is for protecting clustered host applications, for example, a clustered file system or a clustered database that are served by more than one host server. In this case, each host server is assumed to have a Host Driver. As illustrated in FIG. 12, Host Driver 1 resides in one of a clustered host server, while Host Driver 2 resides in another clustered host server. These two host servers are clustered to serve the same data source. Host Driver 1 and Host Driver 2 both continuously forward all application and data events to DMS Data Source 1. The events are sequenced and managed at the DMS Data Source 1. Distribution and replication services can also be offered as described in the previous scenarios.

Figure 13:
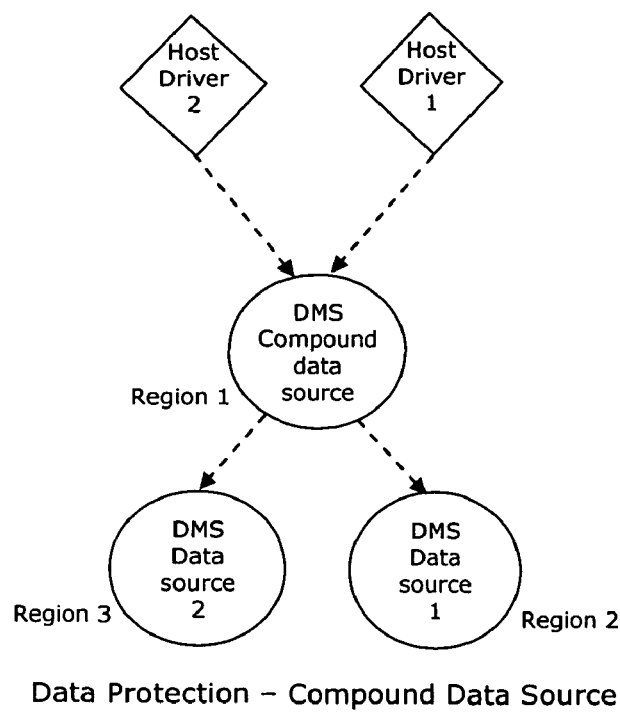
Figure 14:
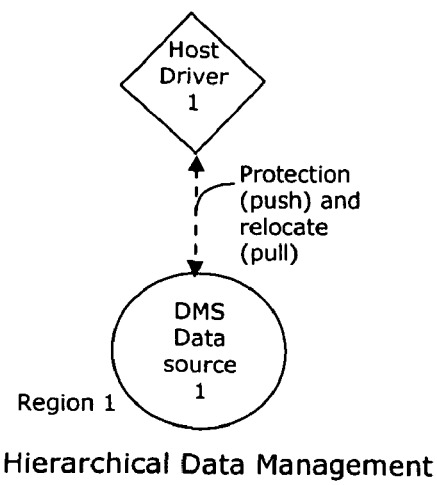

In many cases, an application simply uses one data source, for example, a database for storing its data; in other cases; an application may be using as its data set more than one database or file system. To ensure that the protected data set (as a whole) is consistent in its application point of view, a compound data source is created in a DMS region to receive data streams from the Host Drivers, in this case, Host Driver 1 and Host Driver 2. This is illustrated in FIG. 13. In this scenario, each host driver forwards the application and data events of a data source to the DMS Compound data source. The data set in this case is made up of two data sources. The DMS Compound data source preferably serializes and timestamps the events to ensure the data set consistency for future recovery to any point-in-time. The DMS Compound data source also coordinates with the associated host drivers to generate consistency markers and to create checkpoints across multiple data sources. In the example shown, regions 1-3 may be the same region, or they may be different regions. The DMS Compound Data Source can be distributed, and replication preferably occurs in the same manner as described above.

This data service is policy-based, as has been described. In the scenario illustrated in FIG. 14, the Host Driver 1 sends on-going application and data events to DMS Data source 1. Host Driver 1 deletes data that is not frequently accessed. When a request arrives, Host Driver 1 pulls the data from the DMS Data Source 1 back into the primary storage.

Figure 15:
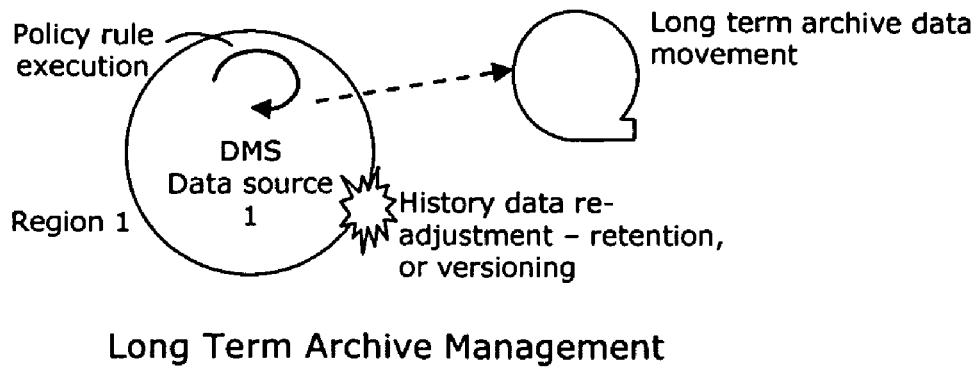

This is also a policy-based data service. It is illustrated in FIG. 15. A policy engine executing in a given DMS node examines the policy rules and attributes (that are assigned to a data object, a group of data objects, a data source, or a group of data sources) to automatically manage the long team data history. For example, old data may be periodically migrated to tape media. Data history of certain age may be pruned. Multiple versions of history may be collapse into one.

Figure 16:
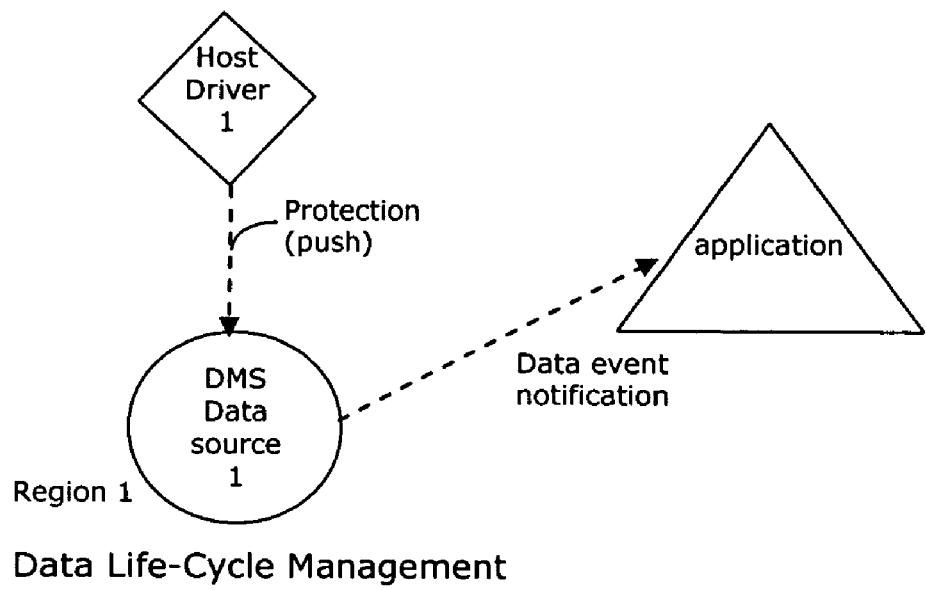

As a DMS cluster receives application and data events, it may notify an external application entity, which may perform additional tasks to manage the host or DMS data source. This scenario is illustrated in FIG. 16. For example, the application may make copies of the primary data, or the application may index a changed data to allow for search.

As a DMS cluster receives real-time application aware data changes and events, it stores, tracks and indexes this information. The events may include, without limitation, the opening of an object for read, the opening of an object for write, entry of a user's credential, the location of the data source, a timestamp of when a particular update occurs, a timestamp of when a particular deletion occurs, and so forth. Such sequences of data and events allow the DMS to provide an auditing and compliance function or managed service, e.g., who did what, when and where?

As noted above, DMS provides real time data services, such as continuous data protection, data replication, data distribution, any-point-in-time recovery, and any-point-in-time snapshot. To support these services, a DMS host driver resides in an application host or the network, monitoring and capturing application events and data changes in real time, and then processing and forwarding actual data changes, events, and metadata to a DMS node. The host driver preferably performs delta reduction (e.g., to extract byte level changes), identifies metadata changes such as access control, detects application checkpoint events, and then forwards this information as a stream to a DMS node in a DMS cluster. A DMS cluster is a group of DMS nodes that share a storage module. These nodes work as a cooperative unit. Preferably, they obey a set of access rules such as acquiring lock of different classes, and they honor the access locks of the others so as to perform parallel access to the storage module. These nodes also watch for the health of one another and when one node fails, the other nodes preferably repair any partially modified or corrupted data that may be caused by the failure, and take over the tasks of the failed node.

The DMS nodes are the entities that provides real-time data services. When providing continuous data protection and data distribution as subscriber, the nodes take incoming data streams, translate the streams into an object-oriented data structure, and save the data in a storage module that is referred to herein as an object store. The object store is designed with the purpose of managing real-time continuous history. When providing data replication, data recovery, and generating a snapshot, the DMS node navigates its object store, reconstructs a desired point-in-time data object, and forms outbound data streams that are then delivered to target nodes or host machines. To provide continuous replication, once replicating a point-in-time data object, the DMS node also forwards, to a remote DMS or a remote host server, a continuous redo log of the objects (in the form of a real-time event journal). A goal of the DMS is to store fine grain and real-time data history. Thus, the DMS object store is designed to track fine grain data changes without using excessive storage. The DMS preferably also indexes by time all fine grain objects, application checkpoints, and metadata globally across DMS clusters.

The DMS nodes create distributed object storage to provide the necessary real-time data management services. The objects created by the DMS nodes are called active objects. The active objects at any moment in time may be dormant in the storage or instantiated by the DMS nodes to handle requests and to perform activities. The details of active objects are discussed in the following sections.

The distributed object store can be built above raw storage devices, a traditional file system, a special purpose file system, a clustered file system, a database, and so on. Preferably, DMS chooses to build the distributed object store over a special purpose file system for storage and access efficiency. The files in the special purpose file system and the active objects in the DMS preferably are all addressed by a 128 bit global unique identifier (GUID). During runtime, a GUID can be de-referenced to a physical address in a storage device. By doing so, this allows the object store to scale beyond a single storage device, such that an object (1) in a device (A) can refer to another object (2) in device (B), e.g., by referring to the GUID of object (2).

Preferably, each DMS node executes an object runtime environment. This object runtime environment includes an object manager that manages the lifecycle of all the DMS objects during runtime. The object manager creates DMS objects, the active objects, and the object manager saves them in the shared storage. When requested, the object manager loads an existing active object from the storage, and then routes object requests directly to the instantiated active object. Once an active object is created or loaded (instantiated) into the memory, it is responsible for executing requests routed from the object manager. The object manager performs necessary authentication and authorization before allowing any access to an active object. An active object, upon request, may update its internal information, execute an object specific program, and terminate itself from the runtime environment. Both the object manager and the active objects are responsible for acquiring shared lock as necessary so that all the nodes can have parallel access to the same objects. The object manager is also responsible for permanently removing active objects from the shared storage when requested.

An instance of an active object has a set of properties, with each property having a label and value pair. For example, an active object may have one property labeled as "name" with an associated value being "The design of a PC," and another property labeled "content" which associated value is a binary blob. A property has a value type definition, for example, the value of the "name" property is a string, and the value of the "content" property is an opaque binary chunk of data.

For example, when DMS protects a file from server, the DMS active object for the file may have a list of representative properties such as shown in FIG. 17. In the context of a traditional file system, preferably all properties beside the "content" property are classified as metadata whereas, in the DMS, preferably all properties including the "content" itself are managed as metadata. The DMS active objects store metadata from the protected server as well as metadata generated by the DMS itself. In DMS active object point of view, all the properties are metadata, including the binary content from the external world, while binary content is just a specific property type (random access binary blob type).

A property on an active object preferably also has specific attributes such as —modifiable, modifiable-internal, readable, versionable, single-value vs multi-value, inheritable, index, mandatory, replicate-able, and the like. Some object properties, such as ObjectClass, ObjGUID, Creator, ExternalCreationDateTime, and DMSCreationDateTime do not change once the object is created, while the other properties can be modified. There are also properties, such as Version, DMSModifiedDateTime, and DMSTerminationDateTime, that are not modifiable by any external entity besides the Object Manager and the object itself.

FIG. 18 is a table of possible property types. FIG. 19 is a table of possible attributes for each property.

To track real-time changes, some object properties must be defined as versionable. In the DMS, an object data structure for tracking data history is as shown in FIG. 20. In FIG. 20, pages are simply logical and variable size chunk of data entities. Each page is labeled with a GUID. An anchor page 2002 contains the <property, value> of those metadata that are not version-able and do not change over time, while the metadata page (2004, 2006 and 2008) of each version contains only the versioned properties. The pages refer to one another by GUID. In addition, an object may have Access Control List (ACL) that specifies who has what level of access right to the data. In the case of DMS, the ACL is stored in a separate page 2010 or 2012, such that multiple objects that have the same ACL can refer to the same ACL page. ACLs can also be stored within the version metadata pages or as separate active objects.

In DMS, preferably all the anchor and version metadata pages are combined together into a variable sized file. If desired, each one of the pages can be stored in a separate file, or in raw storage blocks. When stored in files, each file is also named by GUID. There are page GUID to file GUID mappings, and file GUID to physical address mappings so that the physical data of an object can be retrieved. An object can be reference by the GUID of its anchor page, or the GUID of its version metadata page. When referred by the GUID of its version metadata page, a point-in-time object is presented.

Figure 21:
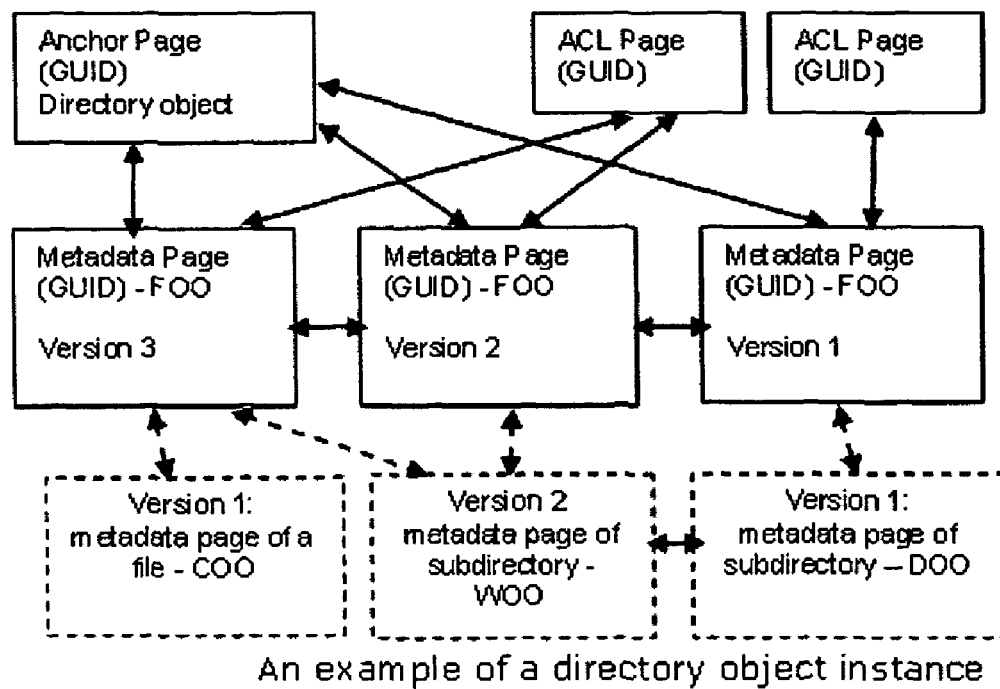
FIG. 21 illustrates a representative instance of a directory object.
Figure 22:
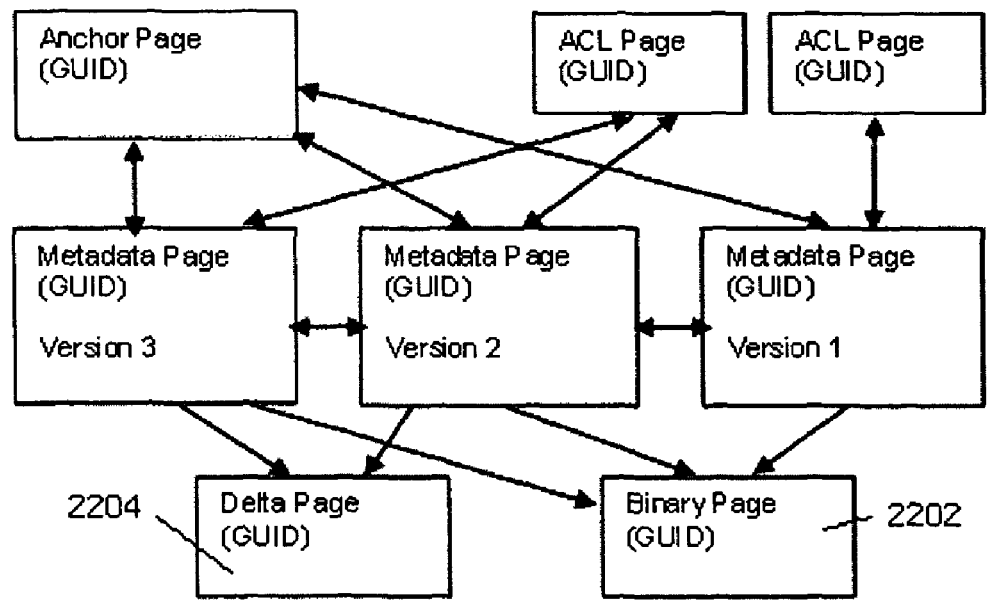
FIG. 22 illustrates a representative instance of a file object.

In DMS, and as will be described in more detail below, preferably there are many data source active object classes, for example, a directory object, a file object, database object, and the like. FIGS. 21-22 illustrate sample instances of a respective directory object and a file object. In particular, in FIG. 21 the directory object (FOO) has three versions. In the first version, the directory object only has the version 1 of a subdirectory object—DOO. The subdirectory object changed its name to WOO, thus a version 2 of the subdirectory object is created; as a result, a version 2 of FOO is created to link to the version 2 of the subdirectory. On version 3 of FOO, a new file under the directory FOO is created. The links, shown as dotted arrows, on the directory object FOO are stored as a "CHILDREN" property, and this property is of multi-value GUID type. These links allow the active object to build up object relationships or an object hierarchy; in this case, which is merely representative, it is parent-child relationship. This is a logical view of the directory data structure. For conservation of storage usage, the directory version pages may be combined into a table or a journal, and the table or journal may be stored in a special purpose file or a raw device block. For simplicity, the above diagram intentionally does not show the entire subdirectory and file objects (for example, the anchor pages are not shown).

FIG. 22 is an example of a DMS file object, which is an active object that tracks history, as opposed to a file in a traditional file system. The DMS uses this object structure for storing the history of a file from an external host server. As previously mentioned, in one embodiment of the invention, the DMS overlays the object structure of its object store over a special purpose file system for storage usage efficiency. Thus, the object store is a logical structure and the file system is the physical structure. In the DMS file object, preferably there is a property called "CONTENT," and this property is of the type random access binary blob. The binary value of this property type may be stored inside or outside of the metadata page. In this case, the binary data of version 1 is in a binary page 2202 that has its own GUID. The changes (deltas) that are made to the file for version 2 may be stored as a sequence of forward deltas in a delta page 2204. The changes (deltas) of version 3 may also be appended to the same delta page or another new delta page. Both the binary and delta pages may be stored in one special purpose file, be broken up and stored in multiple special purpose files, or be stored in raw storage devices.

Active object binary data management is designed for managing history of random access binary blob property type. As shown in FIG. 21, the property type of random access binary blob may be stored inside a metadata page, or it may be stored outside a metadata page in both binary and delta pages. Regardless of how the random access binary data are stored, the DMS manages this data the same way, preferably through a sparse index. As mentioned earlier, for binary data management, an initial full binary content is first captured into a binary page, and then the random changes to the binary contents are stored as a sequence of forward deltas (or delta strings) in delta pages. Delta strings preferably are of specific syntax. A delta string can represent an insertion, a deletion, or a replacement to an existing binary blob. To avoid having to apply deltas in real-time when a file version is accessed, preferably a byte level index is maintained as part of the random access binary blob property. The sparse index for version 1 of a file may specify that the entire binary content of the file is in a specific binary page. The sparse index for version 2 of the same file may specify that certain byte ranges of the binary content of version 2 are in some specific locations of the binary page, while other byte ranges are in some specific locations of the delta pages.

For the active objects to manage history of sequential access binary blob such as database journal activities, a binary page of sequentially appended records structure can be used in the DMS. Records management is designed for managing property type of sequential access binary blob. There are three different types of record management namely—formatted records, unformatted records, and file object associated records. Formatted records are a sequence of well defined records, each record is of specific structure of fields, and each field has well defined data type and length. A record schema (record structure definition) is defined for formatted record property type. This type of record can be used to track SQL requests of a database history, or email activities of an email server history. A formatted record can also be used to track real-time events associated with any data object. Unformatted records are a sequence of binary record chunks, in this case, the record chunks may be appended continuously to a binary data page with or without a header that specifies the length of the record. Alternatively, records can be appended to a binary data page without a header, in which case, the boundary of each record chunk is tracked separately. The boundary of unformatted records can be tracked using formatted record management structure. This type of record can be used to track sequential binary journal of a database or sequential journal file of any application. The characteristic of this type of binary journal is that records are always appended to the end and never override previous records. File object associated records are sequences of meta-information containing binary data updates to an associated file object. A file object associated record is used to track the location and length of each modification to a file object. Besides tracking the file modifications, a file object associated record can also be used to track checkpoints that occur with respect to the file.

According to another aspect of the inventive DMS, an active object has a basic set of behaviors and some specific set of behaviors created specifically for the class definition. The following are examples of the basic set of behaviors that may be initiated by the interface for life cycle management, getting and setting attributes:

CreateObject (of a specific class)
DestroyObject (an object GUID)
ObjectOpen (an object GUID, a point-in-time, and mode)
ObjectClose (an opened object handle)
ObjectTerminate (an opened object handle)
ObjectLock (an opened object handle, and mode)
ObjectGet (an opened object handle, a list of properties)
ObjectSet (an opened object handle, a property, a value)
ObjectMVGetFirst (an opened object handle, a property)
ObjectMVGetNext (an opened object handle, a property)
ObjectMVGet (an opened object handle, a property, key)
ObjectMVAdd (an opened object handle, a property, value)
ObjectMVDelete (an opened object handle, a property, key)
ObjectRead (an opened object handle, a property, an offset, a length)
ObjectWrite (an opened object handle, a property, an offset, a length, data)
ObjectApply (an opened object handle, a property, a delta string)

ObjectRecordAppend (an opened object handle, a property, record, length)
ObjectRecordGetFirst (an opened object handle, a property)
ObjectRecordGetNext (an opened object handle, a property)
ObjectRecordGetAt (an opened object handle, a property, a position)
ObjectExecute (an open object handle, a function, parameters)

These functions may be implemented readily in software code, i.e., as a set of program instructions executable in a processor. CreateObject( ) creates a physical active object in the DMS object store, while DestroyObject( ) removes the physical object completely. Once created, an active object can be instantiated by ObjectOpen( ) and it can be manipulated. ObjectClose( ) ends the execution cycle of an object. ObjectTerminate( ) terminates an object version and prevents a new version from ever be created. ObjectGet( ) and ObjectSet( ) are for accessing a single value property; the generic behavior for setting a property is to first validate the property type before allowing the update to occur. ObjectMVGetFirst( ), ObjectMVGetNext( ), ObjectMVGet( ), ObjectMVAdd( ), and ObjectMVDelete( ) are for accessing a multi-value property. A multi-value property has unique key, for example, CHILDREN may be a multi-value property, and its unique key may be the name or the GUID of the child. ObjectRead( ), ObjectWrite( ), and ObjectApply( ) are for accessing metadata of a random access binary blob type. ObjectRecordAppend( ), ObjectRecordGetFirst( ), ObjectRecordGetNext( ), and ObjectRecordGetAt( ) are for accessing metadata of sequential access binary blob type.

The above object interfaces are a representative subset of the actual basic object behaviors of the DMS. There are merely illustrative of the functional behavior of the active objects. If desired, an object class may define its own set of specific behaviors.

DMS Object Instance Hierarchy

To provide real-time data management services, DMS preferably defines a set of data management specific object schemas. These object schemas are used to create the "active" objects that have specific metadata and behaviors as defined in the schema. The DMS object definition set forth below is a preferred way of organizing the control, data, and functional structure for the DMS to provide real-time data management services.

The schema clsDMSSystem is a class for creating a DMS cloud active object that represents the logical network of the entire DMS system (with multiple DMS clusters over multiple regions). Preferably, there is only one instance of clsDMSSystem in a DMS network, as it is the root object instance of the entire DMS network. Preferably, this object is used for tracking DMS regions (each as an instance of a clsRegion schema as described below) and DMS functional groups that own data across regions (each as an instance of a clsGroup schema as described below). The instance typically has a randomly assigned unique identifier. The instance preferably is created automatically by the DMS network when a first cluster is configured, i.e. it is created by a first node. This object instance is populated to all the storage clusters in the entire DMS network. Preferably, there is only one master copy of this object, which is the original copy, the one that was created first. When the properties of the instance change, the properties are populated to all replicas.

The schema clsRegion is a class for creating DMS region active objects that represents and tracks a DMS cluster network, data network, and server network. Preferably, there is one instance of clsRegion in each physical location. An active object instance of clsRegion is used for tracking all the DMS clusters (each as an instance of a clsCluster schema as described below), repositories (each as an instance of a clsRepository schema as described below), and host servers (each as an instance of a clsHost schema as described below) in the region. Because each region may have multiple storage clusters, the local instance of the clsRegion object is replicated to all the local storage clusters. The GUID of each instance of clsRegion are randomly assigned when created.

The schema clsRepository is a class for creating a DMS data container for storing protected data sources. A repository instance may have sub-repository instances and/or protected data sources. A root repository object that is directly under a region represents a segment of a data network. A repository may be a child of a region or a child of another repository. The child of a region is the root of a DMS data object hierarchy. The repository object provides regional data grouping and policy enforcement. The policies in a repository are executed against all the data sources within the scope of the repository.

The schema clsXXDataSource is a class for creating data sources. Preferably there are three data source schemas, clsFSDataSource, clsDatabaseDataSource, clsCompoundDataSource. An active object instance of a clsXXDataSource is a root container for a protected data source where a data source from a host is streamed. An instance of clsFSDataSource contains a file, a directory, or a volume of a file system and its history, while an instance of a clsDatabaseDataSource contains one or more databases and their history from a database server. An instance of a clsCompoundDataSource is a container for multiple data source instances. Unlike a repository that only provides logical containership, a compound data source instance provides sequencing and consistency marking to the real-time activities of its related group of data sources so that group consistency can be maintained.

The class clsFile is a schema for creating object instances for the DMS to store the information of a file from a host server and also to track the history of that file in the host. An instance of a clsFile is similar to a file in a file system, except that an instance captures and manages file history. In DMS, this object is used for data protection, with each instance of clsFile used to represent an external file in an external host.

The class clsDirectory is a schema for creating object instances for the DMS to store the information of a directory from a host server and also to track the history of that directory in the host. An instance of a directory simply represents a container of files and other sub-directories.

The class clsDatabase is a schema for creating object instances for the DMS to store the information of a database within a database server, and also for tracking the history and checkpoints of that database in the server. This object is used to provide database protection services. An instance of a clsDatabase represents a consistent range of time of a database in an external server.

The class clsJournalGroup is a schema for creating object instances for the DMS to journal the redo and undo log (journal) activities of a database. The database journal activities may be updates to a group of related journal log files, or application level transaction activities.

The class clsRecordFile is a schema for creating object instances for the DMS to track sequential journal entries within a journal group.

An active object instance of the clsHost is created whenever a host driver from a new host server first connects to the DMS network. This object allows the DMS to track the data services provided to the information on the host. This object also associates the protected data sources in the DMS to the data source on its host server. An instance of clsHost preferably contains information such as the platform of the host, the operating system, the host configuration, data sources that are protected from the host, DMS data sources that are replicated to the host, and the like. The protected or replicated data source properties preferably include the host path, the size of the sources in the host, the activities and statistical information about those data sources, and the GUID of the clsXX-DataSource instance.

An active object instance of the clsDMSCluster schema represents a DMS cluster with one or more DMS nodes and the DMS storage. This instance provides statistics and status information of its specific cluster. Typically, there is only instance per storage cluster, thus the processes (e.g., the object runtime environment) of all the nodes use this instance as shared memory to keep information such as node availability, master election, and the like. Information about a DMS cluster (as instances of a clsDMSCluster), a DMS node (as instances of clsDMSNode), and DMS storage (as instances of clsDMSStorage) may be stored together with the other active objects or may be in a specific volume used exclusively by the cluster manager.

An active object instance of the clsDMSNode schema represents a DMS node within a DMS cluster. This instance provides statistics and status information about the DMS node it represents. Preferably, the object runtime environment of a node is responsible for locating a cluster and joining that cluster. Once joined in a cluster, the runtime environment creates the clsDMSNode instance.

An active object instance of the clsDMSStorage schema represents the storage volumes of a DMS cluster. This instance allows the DMS storage to be configured, and it also provides statistics and status information of the storage volumes.

An active object instance of the clsGroup schema is a data container that also represents a logical group in an organization. This allows user to map data sources from one or multiple repositories in one or more regions to a functional group of an organization. Its purpose is to enable an administrator or other permitted entity to assign data management policy across multiple regions.

An active instance of the clsPolicyProfile schema contains a set of data management policies. There may be one or many policy profiles in the DMS network. A policy profile object can be assigned (as a default data management policy) to any data container, such as the universe, regions, repositories, groups, or protected data sources, or to any data object, such as files, directories, and databases. When assigned to a container, all sub-containers or the data objects within that root container are governed by the set of policy rules. As noted above, a region (or a repository) object allow an administrator to set policies for data in the same region, while a functional group object allows an administrator to set policies for data in multiple regions. Typically, a policy is a combination of a set of properties, e.g., a rule, an override rule, one or more qualifying events, one or more qualifying property values, and/or a schedule. A rule may be a Boolean expression with an action, and a rule may be nested.

Similar to an instance of a clsPolicyProfile object, an active object instance of a clsPolicyOverride also contains a subset of data management policies. When assigned to a data container or data object, the policies in the override object takes precedent over the default policy on an assigned policy profile objects.

In a DMS cluster, preferably DMS active objects are grouped in such a way that each data source and its children (i.e., all the data objects in that scope) are stored within a logical volume called a storage group, and all the other DMS system objects such as the DMSSystem, Region, Group, Repository, Host, Cluster, Node, and Storage active objects (configuration and control objects) are in yet another logical volume (storage group). In each storage group (logical volume), preferably all object updates are logged into a write-ahead log with redo and undo entries similar to that of a database. The redo entries preferably have a similar format to the real-time event journal stream. To provide real-time data distribution and replication services, the DMS may first ship the initial active objects from a storage group and then in real-time forward the redo log (similar to the real-time event journal) to apply on the remote end, which can be another DMS node or a remote host for the data distribution and replication service. Alternatively, the DMS can provide real-time distribution and replication on a per object basis. In this case, instead of forwarding the redo log from an entire storage group (i.e. data source, or system objects), each active object may forward its own changes to a remote replicated object either in another DMS node or a host server.

Figure 23:
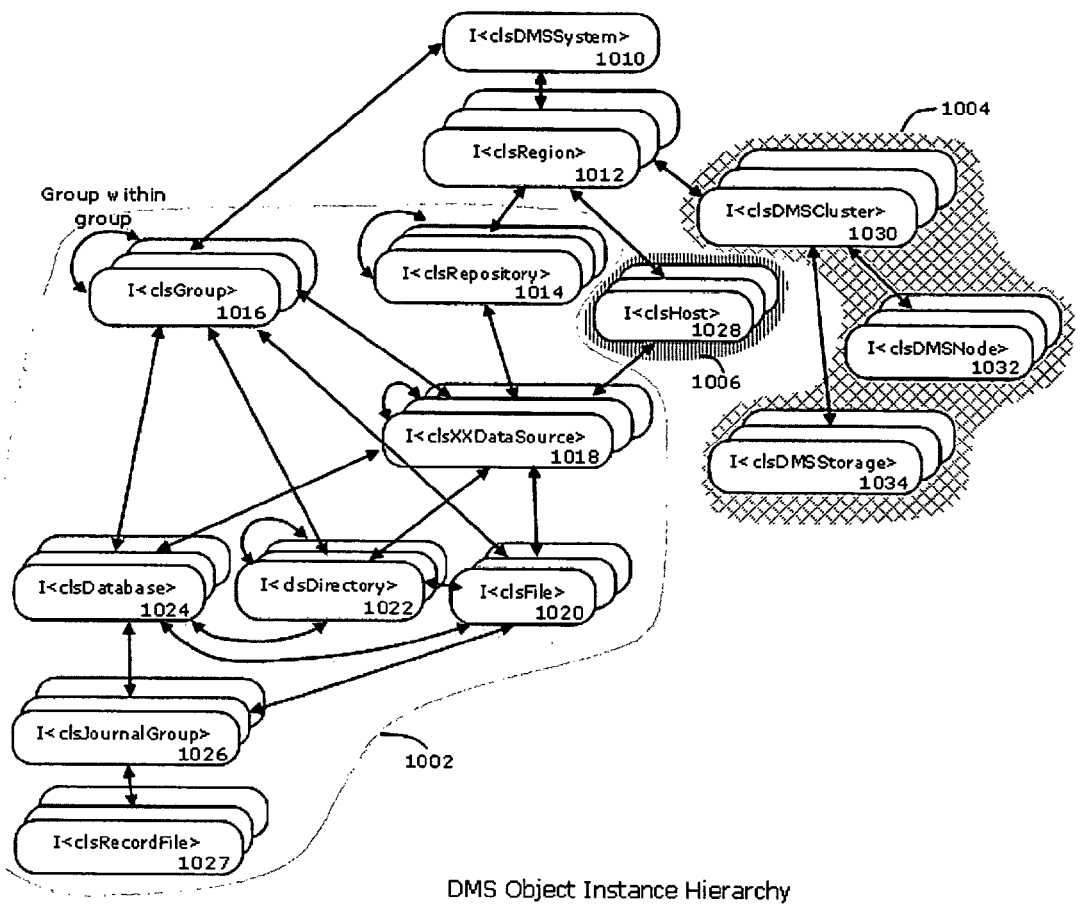
FIG. 23 illustrates a preferred DMS object instance hierarchy according to the present invention.

FIG. 23 illustrates a relationship among DMS active objects. This diagram does not show any object history (object versions). Policy profile and policy override objects are also not shown in this figure to avoid complexity.

In FIG. 23, an active object instance is represented by I<object schema> (note that a schema is the same as a class; it is the definition of an object). The "I" stands for instance, and object schema is the definition of that object class. As illustrated, there is only one instance of the DMS system object 1010 (i.e. one DMS network). As illustrated, one or more regions 1012, and zero or more functional groups 1016 can be created under the DMS network. As noted above, the region and group active objects are used for storing configuration information about the region and the functional group. Functional groups may have sub-groups (i.e. group within group). Data repositories 1014 can be created under a region 1012. Much like groups, repository may have sub-repositories 1014, as has been described. Protected data sources 1018 reside within a repository 1014. Data may be streamed into a data source from a protected host server, or streamed into a data source from another DMS data source through remote distribution service provided by the DMS. A data source may be configured to replicate to a remote repository. Within a data source 1018, the real-time history of data files 1020, directories 1022, databases 1024, database journals 1026, email databases, email messages, and the like, are captured and indexed. The groups 1016, repositories 1014, protected data sources 1018, and the data objects within the data sources are known as the data network 1002. Although not shown in this diagram, policy can be assigned to all the objects in the data network and all the objects above the hierarchy of the data network. Preferably, policies are enforced in hierarchical order and with specific override rules.

Whenever a DMS host driver is installed into a host server, the host driver reports to the DMS, and this operation results in an instance of host object 1028 being created in the DMS. As noted above, preferably a host object 1028 contains information such as the host OS and platform about the host server. Once a host object is created, IT administrators can identify host data to be protected, and then configure for the host data to be protected. An IT administrator can also configure for DMS protected data to be replicated to a host server. As noted above, the host active object refers to the data source(s) that are protected from its host server or data sources that are replicating to its host (as illustrated by the link between 1018 and 1028). The host objects in the DMS form an external host server network 1006.

A region may have one or more DMS clusters, with all DMS clusters preferably tracked by the DMS via DMS cluster active objects 1030. Each cluster has a representation active object that refers to the node active objects 1032 and storage active objects 1034. The cluster object also contains cluster statistic and status information. A node object 1032 contains configuration information, statistics and status about the node. The storage object contains storage volume information, and storage group information. Volume information includes all the raw storage volumes that are provisioned to the DMS. It also includes the DMS partitioning of the raw storage volumes, and the assignment of the partitions to storage groups. In the DMS, a protected data source has its own storage space that is called a storage group. A storage group is an aggregated DMS storage partitions carved out from the volume groups. The cluster, storage, and node objects form a DMS server network 1004.

While the object instance hierarchy of FIG. 23 is preferred, the structure may be reorganized. For example, the class cisRegion may be broken down into multiple hierarchies to represent local lines of business and departments, the class clsDMSCluster may includes nodes and storage so as to eliminate clsDMSNode and clsDMSStorage definitions, the class clsJournalGroup may be part of the clsDatabase definition, and so on. All of these variants are within the scope of the present invention.

As one of ordinary skill in the art will appreciate, the present invention addresses enterprise data protection and data management problems by continuously protecting all data changes and transactions in real time across local and wide area networks. Preferably, and as illustrated in FIG. 1, the method and system of the invention take advantage of inexpensive, commodity processors to efficiently parallel process and route application-aware data changes between applications and low cost near storage.

While the present invention has been described in the context of a method or process, the present invention also relates to apparatus for performing the operations herein. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Although a number of different data services have been described, it should be appreciated that one advantage of the present invention is that a given DMS appliance can provide one or more such services. It is a particular advantage that a given appliance can provide a consolidated set of data services on behalf of a particular data source. As has been described, this operation is facilitated through the provision of the host driver, which captures, as a data history, an application-aware data stream. The application-aware data stream comprises data change(s), events associated with the data change(s), and metadata associated with the data change(s). As has been described, this information is streamed continuously to the appliance (or to a set of cooperating appliances) to facilitate provision by the appliance of the desired service(s).

Having described our invention, what we now claim is as follows:

1. A data management system, comprising:
a server node coupled to a data storage;
a data manager executing on the server node;
a data source comprising an embedded application-aware host driver that captures real-time data transactions;
a continuous application-aware output data stream that originates from the embedded application-aware host driver and is received by the data manager;
wherein the received continuous application-aware output data stream comprises, for an event associated with the data source:
event-identifying data;
metadata; and
data changes;
wherein the data manager preserves a data history of the data source by translating the received continuous application-aware output data stream into an object-oriented data structure, wherein the object-oriented data structure includes unformatted records, the unformatted records include a sequence of binary record chunks, the record chunks append to a binary data page with a header that specifies the length of the unformatted record, and wherein file object associated records include sequences of meta-information which include updates to an associated file object, the file object associated records track a location and a length of each modification to the associated file object, thereby forming a translated data stream, and storing the translated data stream in an object store on the data storage; and
wherein the data manager provides one or more data services via the data history.

2. The data management system of claim 1 wherein the one or more data services include a data service that involves a pair of endpoints between which the application-aware real time event data stream is exchanged.

3. The data management system of claim 2 wherein the pair of endpoints comprise the data source as a first endpoint and a given node in the set of server nodes as a second endpoint.

4. The data management system of claim 2 wherein the pair of endpoints comprise a node in the set of one or more server nodes as a first endpoint, and a node in another set of nodes as a second endpoint, and wherein the data service distributes the application-aware real-time event data stream between the pair of endpoints.

5. The data management system of claim 2 wherein the pair of endpoints comprise a node in the set of one or more server nodes as a first endpoint, and an external data source as the second endpoint.

6. The data management system of claim 1 wherein the one or more data services include one of: data protection, data distribution, data replication, data copy, policy-based archive management, policy-based hierarchical management, and policy- based life-cycle management.

7. The data management system of claim 1 wherein the data service is one of: an auditing function and a compliance function.

8. The data management system of claim 1 wherein the data source is a data set associated with an application.

9. The data management system of claim 1 wherein a plurality of server nodes share the data storage.

10. The data management system of claim 9 wherein the plurality of server nodes perform parallel access to the data storage.

11. The data management system of claim 9 wherein each server node of the plurality of server nodes monitors the operative health of the other server nodes of the plurality of server nodes.

* * * * *